(12) United States Patent
Wunsch et al.

(10) Patent No.: US 8,326,736 B2
(45) Date of Patent: *Dec. 4, 2012

(54) LINKED DISPLAYED MARKET AND MIDPOINT MATCHING SYSTEM

(75) Inventors: Steve Wunsch, New York, NY (US); Robert Books, Hoboken, NJ (US)

(73) Assignee: International Securities Exchange, LLC, New York, NY (US)

( * ) Notice: Subject to any disclaimer, the term of this patent is extended or adjusted under 35 U.S.C. 154(b) by 98 days.

This patent is subject to a terminal disclaimer.

(21) Appl. No.: 12/826,132

(22) Filed: Jun. 29, 2010

(65) Prior Publication Data

US 2010/0268638 A1 Oct. 21, 2010

Related U.S. Application Data

(63) Continuation of application No. 11/731,909, filed on Apr. 2, 2007, now Pat. No. 7,774,263, which is a continuation-in-part of application No. 11/222,141, filed on Sep. 7, 2005, now Pat. No. 7,761,364.

(51) Int. Cl.
*G06Q 40/00* (2012.01)
(52) U.S. Cl. ........... 705/37; 705/36 R; 705/38; 705/26.4
(58) Field of Classification Search .................. None
See application file for complete search history.

(56) References Cited

U.S. PATENT DOCUMENTS

| | | | |
|---|---|---|---|
| 3,573,747 A | 4/1971 | Adams et al. | 340/172.5 |
| 3,581,072 A | 5/1971 | Nymeyer | 235/152 |
| 4,412,287 A | 10/1983 | Braddock, III | 364/408 |
| 4,674,044 A | 6/1987 | Kalmus et al. | 364/408 |
| 4,903,201 A | 2/1990 | Wagner | 364/408 |
| 4,980,826 A | 12/1990 | Wagner | 364/408 |
| 5,101,353 A | 3/1992 | Lupien et al. | 364/408 |
| 5,136,501 A | 8/1992 | Silverman et al. | 364/408 |
| 5,297,032 A | 3/1994 | Trojan et al. | 364/408 |
| 5,305,200 A | 4/1994 | Hartheimer et al. | 364/408 |
| 5,664,115 A | 9/1997 | Fraser | 705/37 |

(Continued)

FOREIGN PATENT DOCUMENTS

EP 0411 748 5/1990

(Continued)

OTHER PUBLICATIONS

Interactive Brokers, "Order Types", Aug. 14, 2004, pp. 1-5, Retrieved from http://web.archive.org/web/20040814111917/www.interactivebrokers.com/php/tradingInfo/orderTypesMatrix.php.*

(Continued)

*Primary Examiner* — Gregory Johnson
(74) *Attorney, Agent, or Firm* — Stephen J. Lieb, Esq.; Frommer Lawrence & Haug LLP

(57) ABSTRACT

An automated system for matching orders to buy and sell securities including a displayed market where orders are executed at a BBO price and where information about the market is made available to investors and a midpoint matching market for matching buy and sell orders at a predetermined price, namely, the midpoint between the national best bid and offer. The displayed market and the midpoint matching market are linked so that orders submitted to the displayed market are exposed to the midpoint matching market and can be executed at an improved price if a contra order is available on the midpoint matching market.

27 Claims, 20 Drawing Sheets

U.S. PATENT DOCUMENTS

| | | | |
|---|---|---|---|
| 5,689,652 A | 11/1997 | Lupien et al. | 395/237 |
| 5,715,402 A | 2/1998 | Popolo | 705/37 |
| 5,787,402 A | 7/1998 | Potter et al. | 705/37 |
| 5,905,974 A | 5/1999 | Fraser et al. | 705/37 |
| 5,913,202 A | 6/1999 | Motoyama | 705/35 |
| 5,924,082 A | 7/1999 | Silverman et al. | 705/37 |
| 5,946,666 A | 8/1999 | Nevo et al. | 705/36 |
| 5,950,177 A | 9/1999 | Lupien et al. | 705/37 |
| 5,970,479 A | 10/1999 | Shepherd | 705/37 |
| 5,978,779 A | 11/1999 | Stein et al. | 705/37 |
| 6,014,643 A | 1/2000 | Minton | 705/37 |
| 6,016,483 A | 1/2000 | Rickard et al. | 705/37 |
| 6,035,288 A | 3/2000 | Solomon | 705/37 |
| 6,076,068 A | 6/2000 | DeLapa et al. | 705/14 |
| 6,112,189 A | 8/2000 | Rickard et al. | 705/37 |
| 6,317,727 B1 | 11/2001 | May | 705/37 |
| 6,377,940 B2 | 4/2002 | Tilfors et al. | 705/37 |
| 6,560,580 B1 | 5/2003 | Fraser et al. | 705/37 |
| 6,618,707 B1 | 9/2003 | Gary | 705/37 |
| 7,558,753 B2 | 7/2009 | Neubert et al. | |
| 2001/0042040 A1 | 11/2001 | Keith | 705/37 |
| 2001/0044767 A1 | 11/2001 | Madoff | 705/37 |
| 2003/0120585 A1* | 6/2003 | Rosenblatt | 705/37 |
| 2003/0130925 A1 | 7/2003 | Maliltzis | |
| 2003/0130926 A1 | 7/2003 | Moore et al. | |
| 2003/0177086 A1* | 9/2003 | Gomber et al. | 705/37 |
| 2004/0024689 A1* | 2/2004 | Zhou et al. | 705/37 |
| 2004/0034591 A1 | 2/2004 | Waelbroeck et al. | |
| 2005/0240510 A1* | 10/2005 | Schweickert et al. | 705/37 |
| 2005/0246263 A1* | 11/2005 | Ogg et al. | 705/37 |
| 2006/0026090 A1* | 2/2006 | Balabon | 705/37 |
| 2006/0080214 A1 | 4/2006 | Hausman et al. | |
| 2006/0136318 A1* | 6/2006 | Rafieyan et al. | 705/37 |
| 2006/0253379 A1 | 11/2006 | Adcock et al. | |
| 2006/0253382 A1* | 11/2006 | Adcock et al. | 705/37 |
| 2006/0277138 A1* | 12/2006 | Ross et al. | 705/37 |
| 2007/0027788 A1* | 2/2007 | Bandman et al. | 705/36 R |
| 2007/0027795 A1* | 2/2007 | Claus et al. | 705/37 |
| 2007/0038548 A1* | 2/2007 | Schlifstein et al. | 705/37 |
| 2007/0055607 A1 | 3/2007 | Wunsch et al. | |

FOREIGN PATENT DOCUMENTS

| | | |
|---|---|---|
| EP | 0 952 536 A1 | 10/1999 |
| WO | WO 93/15467 | 8/1993 |
| WO | WO 96/34357 | 4/1996 |
| WO | WO 97/03408 | 7/1996 |
| WO | WO 97/42591 | 11/1997 |
| WO | WO 98/38844 | 9/1998 |
| WO | WO 00/28449 | 4/1999 |

OTHER PUBLICATIONS

Anthony Guerra, "SuperMontage", Wall Street & Technology, v 18, n 10, Oct. 2000, p. 1.*

TIBCO and CETIP Set the Pace of Electronic Trade Automation in Brazil; Business Wire, p. 09140076; Sep. 14, 1998; 1-page.*

Business Editors, "TIBCO and CETIP Set the Pace of Electronic Trade Automation in Brazil," Business Wire, New York Sep. 14, 1998, p. 1.

Asani Sarker, "Electronic Trading on Futures Exchanges," Derivatives Quaterly, New York, Spring 1998, vol. 4, Iss. 3, pp. 1-2.

Free for All in Electricity Sector?, Actualidad Economica, Sep. 30, 1996.

Souter, Gavin, Bermuda's Reinsurers Eager to Please, Business Insurance, vol. 28, No. 44, p. 77, Oct. 31, 1994.

U.K.: Branch Closures Hit Poorer Customers, Guardian, p. 18, Feb. 11, 1997.

Eric K. Clemons, "Information Technology and Screen-Based Securities Trading," Management Science, vol. 43, No. 12, Dec. 1997.

Schmerken, Ivy, "The Pandora's Box over Autoquotes," Wall Street & Technology, vol. 15, No. 3, Mar. 1997.

Chicago Board of Trade, Project a Customer Information Statement.

Alex Frino and Jayaram Muthuswamy, Price and time—Priority Versus Pro-Rata Algorithms in Electronically Traded Futures, Department of Finance, University of Sidney, Oct. 3, 1998.

Eric K. Clemons and Bruce W. Weber, "Segmentation, Differentiation, and Flexible Pricing: Experiences with Information Technology and Segment-Tailored Strategies," Journal of Management Information Systems, vol. 11, No. 2, Fall 1994.

Cosgrove, Suzanne, Courting Retail, Institutional Customers, CBOE, AMEX get Creative, Knight-Ridder Financial News, Jan. 29, 1993.

Michaels, George, Distributed Electronic Ordering System, financial software from Financial Technology Corp., Wall Street Computer Review, vol. 8, No. 11, pp. 53-55, Aug. 1991.

Amihud et al., Liquidity, Asset Prices and Financial Policy, Financial Analysts Journal, vol. 47, No. 6, pp. 56-66, Nov./Dec. 1991.

Self-Regulatory Organizations: Notice of Proposed Rule Change . . . Introduction of the CBOE Hybrid System, F.Reg., vol. 68, No. 77 at 19865-74, Apr. 22, 2003.

SEC to Wall Street, Play Fair with the little guy, Wall Street & Technology, Jan. 1, 1997.

Schmerken, Ivy, The Bulls and Bears come out at night, Dealer's Digest, vol. 7, No. 12, p. 14, Sep. 1990.

* cited by examiner

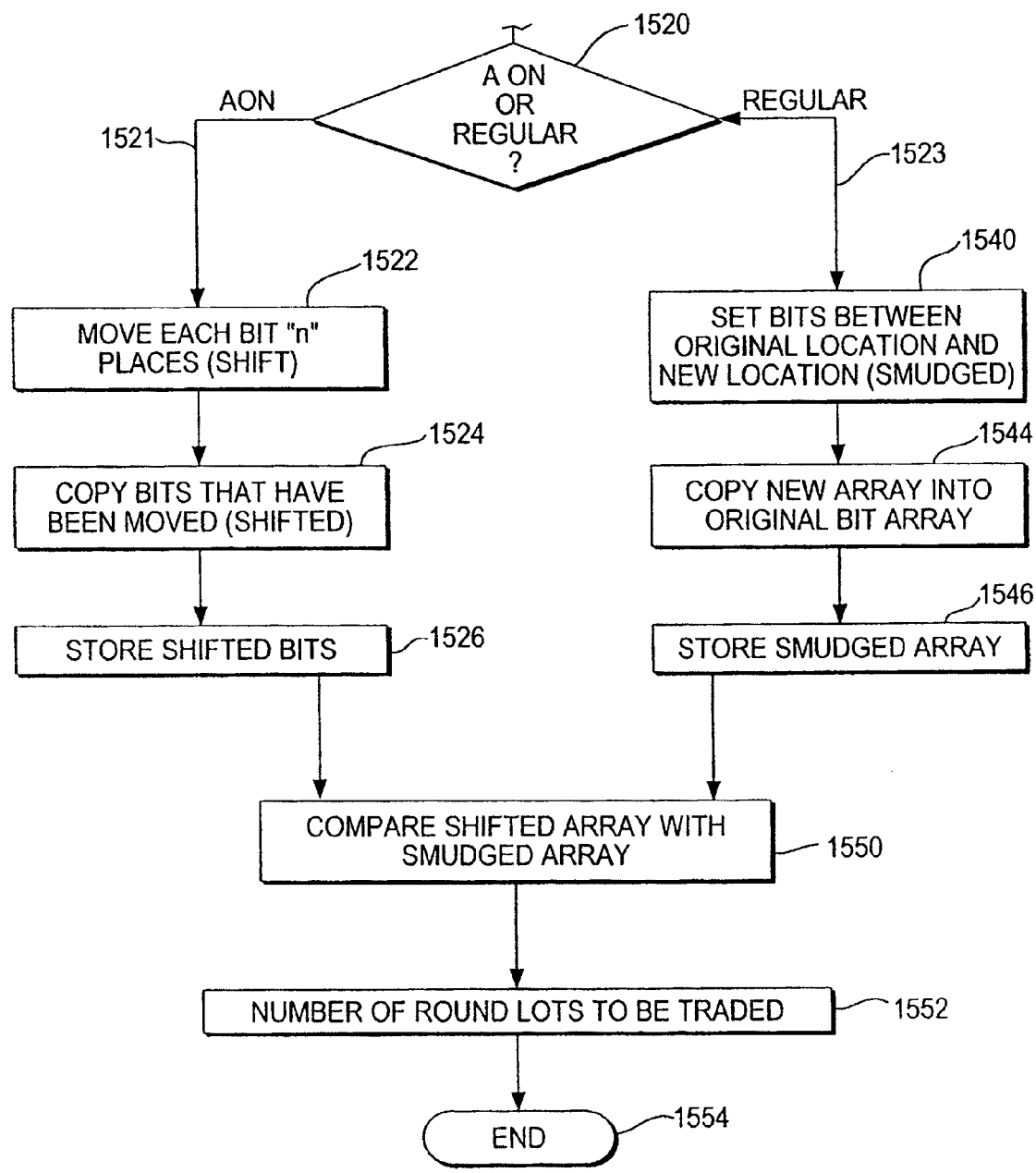
FIG. 15 CONT"d

LINKED DISPLAYED MARKET AND MIDPOINT MATCHING SYSTEM

BACKGROUND

1. Field of the Invention

This application is a Continuation of U.S. patent application Ser. No. 11/731,909, filed Apr. 2, 2007, now U.S. Pat. No. 7,774,263 which is a Continuation-In-Part of U.S. application Ser. No. 11/222,141, filed Sep. 7, 2005 now U.S. Pat. No. 7,761,364. This invention relates generally to an automated system for matching orders to buy and sell securities at the midpoint of a best bid and offer ("BBO"). More particularly, the present invention relates to an exchange for receiving orders to buy or sell securities where the best bid or offer prices (BBO) are displayed coupled with a hidden reserve book of orders that can be matched at the midpoint of the BBO and where orders on the displayed market are matched with orders on the hidden reserve book if the orders on the displayed market are marketable at the midpoint of the BBO.

2. Background Discussion

Conventional trading of securities, such as, for example, stocks, exchange traded funds ("ETFs"), and listed equity options, takes place on a national securities exchange that is registered as such with the United States Securities and Exchange Commission. Exchanges may be floor-based, fully-electronic, or utilize a hybrid model that incorporates some floor-based features and some electronic features. An example of a floor-based exchange is the New York Stock Exchange ("NYSE"). An example of a fully-electronic exchange is the International Securities Exchange ("ISE"). An example of a hybrid exchange is the Chicago Board Options Exchange ("CBOE").

At a conventional exchange, the members of the exchange send their proprietary orders and their customers' orders to the exchange for execution. These exchanges also include market makers or specialists, who contribute proprietary quotes to the exchange. These exchanges are, for the most part, fully-transparent, wherein they each disseminate a BBO and they report the prices at which securities are quoted, bought, and sold to reporting entities that consolidate trading information and disseminate trading data, including a national best bid and offer ("NBBO"). Some exchanges also display the depth of their order books, meaning they display the available size for all prices in the security, above and below its BBO. One of the principal advantages of trading at such exchanges is that orders sent to such exchanges, if marketable (that is, for example, if it is an order to buy, then such buy order is priced at or higher than the best offer), are immediately executed up to the available size displayed in the exchange's BBO. Such markets are sometimes referred to as displayed markets.

For certain types of traders, namely buy-side traders (such as, for example, money managers, mutual funds, pension funds, etc.), the disadvantages of trading at such exchanges may outweigh the advantages. These disadvantages can include higher costs (e.g., payment of the spread—the difference between the best bid and the best offer—as well exchange transaction fees), a lack or compromise of anonymity, ill-equipped electronic execution systems (e.g. Super-DOT), and market impact—that is, the market movement that results when a large order is received. Additionally, too much transparency can also be a disadvantage, depending on the trader and the trade.

As a result, buy-side traders, who were less concerned with the principal benefit afforded by exchanges—immediacy of execution—have sought exchange alternatives that offer lower-cost execution, anonymity, and a reduction in, or elimination of, market impact upon receipt of large orders. This demand led to the development of alternative trading systems, including crossing networks ("Crossing Networks"), such as ITG's POSIT, Liquidnet, Harborside+, and Pipeline Trading. The SEC defines an "alternative trading system" as a system that provides a marketplace for bringing together purchasers and sellers of securities that does not set rules governing the conduct of its participants or discipline its participants.

Crossing Networks provide independent liquidity pools without dealers, and match (or facilitate the matching of) buy and sell orders at a reference price, usually derived from a BBO or other prices from a conventional exchange. Crossing Networks can be passive (meaning executions only occur at certain, pre-defined matching periods), or continuous (meaning executions may occur at any time during the trading day). The common denominator in all current and former Crossing Networks is that they are intentionally, specifically, and, in many cases, exclusively designed to execute block-sized orders—orders to buy or sell a significant number of shares. Following is a brief description of the current, principal Crossing Networks.

ITG's Posit, which is a service available to both buy-side and sell-side participants, operates a passive, midpoint "call market," where a cross occurs roughly every half-hour throughout the trading day. At a random time selected within a one minute window of time after each cross begins, a midpoint price is set at which all matching buys and sells are executed.

Liquidnet, which is a service offered to buy-side institutions only, operates continuously throughout the day. Institutions make the trade blotters of their order management system ("OMS") available to be compared on Liquidnet, which notifies each party when a potential match is found. If parties are interested at that point, they then go into electronic, anonymous negotiation to consummate a trade.

Harborside+, which is a service available to both buy-side and sell-side participants, operates continuously throughout the day. Similar to Liquidnet, it looks for potential matches on OMS blotters. When a match is found, a human broker at Harborside+ calls each party and seeks to help both of them negotiate to complete a trade.

Pipeline Trading, which is a service available to both buy-side and sell-side participants, relies on participant systems entering block orders into its system. Orders that are entered result in screen displays lighting up the symbols of the entered stocks, but does not disclose side. Orders may be priced at any price or at midpoint, which is encouraged by granting near-match notification to midpoint enterers that there is a potential counterparty at a price not far from the midpoint.

While each of the current, principal Crossing Networks has its own, unique limitations, all current, principal Crossing Networks also contain a common limitation in that they lack order processing and matching features necessary to process multiple, computer-generated orders, of any size, transmitted by algorithmic, program, and other automated trading systems and automatically match multiple, executable orders. These trading systems continue to gain in popularity, and are accounting for an increasing percentage of the total volume traded on the conventional exchanges. Further, the current, principal Crossing Networks either prohibit (via not permitting access to their systems) or discourage (via making trading uneconomic through charging higher buy-side-like fees) sell-side traders from participating. Sell-side traders and their customers, who they tend to grant direct, sponsored access to the exchanges, are the traditional users of algorithmic, program, and other automated trading systems. In addition, however, buy-side firms are increasingly starting to utilize algorithmic, program, and other automated trading systems. Moreover, principal Crossing Networks do not readily accommodate order shredding or volume weighted average pricing ("VWAP") trading strategies that are the antithesis of block trading methods. In addition, inevitably, each of the current Crossing Networks has some form of information leakage or gaming ability, which results in compromises in anonymity, either built in by screen displays (Pipeline Trading), through the "sniffing of blotters," or by word of mouth from human intermediaries (Harborside+ and Posit, which also operate agency desks). None of the current, principal Crossing Networks are adapted to receive, process, and match computer-generated orders, of any size, created by algorithmic, program trading, and other automated trading systems.

Thus, Crossing Networks do not provide an efficient trading solution to market participants that utilize algorithmic, program, and other automated trading systems, which market participants are accounting for a continually increasing percentage of overall traded volume on conventional exchanges. Thus, it would be an advancement in the state of the art to make available an automated system for matching orders to buy and sell securities at the midpoint of a BBO, wherein the automated system is adapted to (i) operate on a fully-anonymous and continuous basis, (ii) process multiple, computer-generated orders, of any size, transmitted by algorithmic, program, and other automated trading systems, (iii) automatically match multiple, executable orders according to a priority scheme, and (iv) execute a matching algorithm that maximizes tradable volume when an executable order can not be matched according to the priority scheme.

It would be an advancement in the state of the art to make available an automated system for matching an order to buy and/or sell a security at the midpoint of a BBO where the order is stored in a hidden reserve book until a contra order, executable against the order at the midpoint of the BBO is received. Buy-side investors, who typically place large block orders benefit from such a hidden reserve book because exposure of large block orders may disrupt the market, resulting in such orders receiving worse prices. By allowing block orders to trade at a midpoint of BBO price, large orders can trade with one another without disruption of the market.

It would also be an advancement in the state of the art to make available a displayed market linked to a hidden reserve book so that orders placed on the displayed market can trade against orders stored on the hidden reserve book. Current exchanges display a best bid and offer price for securities, and may provide other information concerning the liquidity of their market, for example, size at BBO and sizes at prices worse than the BBO. Marketable orders sent to current exchanges are executed at the BBO. In general, if an order is not marketable when it is submitted to a current exchange, the order resides on the book and awaits a counter order that will make the order marketable. Current markets lack the ability to inspect orders stored in hidden reserve books and thus, do not make the liquidity of the displayed market available to orders on the hidden reserve book. Such markets also do not provide price improvement between the BBO and the midpoint of the BBO to orders placed on the displayed market when orders available to trade at the midpoint of the BBO are stored on the hidden reserve book.

It would also be an advancement in the state of the art to provide a means whereby orders submitted to a displayed market receive a price improvement by providing an opportunity for such an order to trade on a midpoint matching system. The matching midpoint price is by definition better than the price that could be obtained in the displayed market.

On Apr. 6, 2005 the SEC voted to adopt Regulation NMS ("Reg NMS"), which contains proposals designed to modernize the regulatory structure of the U.S. equity markets including the Order Protection Rule. The Order Protection Rule requires exchanges to obtain the best price for investors when such price is represented by automated quotations that are immediately accessible. Specifically, the rule requires exchanges to establish, maintain, and enforce written policies and procedures that are reasonably designed to prevent tradethroughs.

The introduction of Reg NMS has caused trading to increase in frequency and trade size to decline. The limit order protection proposals have increased demand for non-transparent execution methods including systems with hidden reserve books. Traditional crossing networks suffer from a declining interest in block-based services, an increase in per ticket clearing costs, and a lack of ability to recoup those costs through tape prints. Thus, it would be an advancement in the state of the art to provide a system where liquidity of orders placed on a hidden reserve book is improved by linking such a reserve book with a displayed market.

BRIEF SUMMARY OF THE INVENTION

The present invention is directed toward a system for matching orders to buy and sell securities at the midpoint of a BBO, wherein the automated system is adapted to (i) operate on a fully-anonymous and continuous basis, (ii) process multiple, computer-generated orders, of any size, transmitted by algorithmic, program, and other automated trading systems, (iii) automatically match multiple, executable orders according to a priority scheme, and (iv) execute a matching algorithm that maximizes tradable volume when an executable order can not be matched according to the priority scheme. The present invention may be implemented by a server device or a server device that is operably coupled to, and working in conjunction with, one or more participant systems. A participant system may include an OMS that communicates in CMS or FIX messaging format.

The present invention includes a system for receiving and storing multiple, computer-generated orders, of any size, transmitted by algorithmic, program, and other automated trading systems, including Solicitation of Interest ("SOI") orders, Request for Cross ("RFC") orders, RFC responses, Drip Feed ("DF") orders, and Reserve orders, and automatically matching the multiple, executable orders according to a priority scheme. In addition, the present invention includes executing a matching algorithm that maximizes tradable volume when an executable order can not be matched according to the priority scheme. A priority scheme, for purposes of determining execution order priority, may be associated with each of the above-listed order types.

The present invention is also directed toward a system for matching orders at the midpoint of a BBO that includes a hidden reserve book for storing orders awaiting contra orders to match at the midpoint of the BBO.

The present invention is also directed toward a displayed-type market where orders to buy and sell a security can be traded and where a best bid or offer (BBO) price for orders available on the market are displayed. The present invention is also directed toward a system where such a displayed-type market is linked with a hidden reserve book.

Accordingly, one embodiment of the present invention relates to an automated system for matching orders to buy and sell securities at the midpoint of a BBO. The system includes receiving transaction data indicative of an order, identifying a priority status that is associated with the transaction data, and storing such data in a database. The transaction data may be provided by a buyer or seller and may include instructions for the disclosure of selected message data to one or more market participants. The information in the message data determines a priority status for the order. If applicable, the system transmits the selected message data to one or more market participants. Preprogrammed response data is received from the one or more market participants in response to the message data and the preprogrammed response data is a function of a previously authorized response. A matching algorithm is executed, and executable orders are matched as a function of the transaction data and the response data.

According to another embodiment of the invention, an automated system for matching orders to buy and sell at the midpoint of the BBO includes a reserve book that is linked with a displayed market so that orders submitted to the displayed market that are marketable at the midpoint of the BBO with orders stored on the reserve book are executed against those reserve book orders.

According to another embodiment of the invention, a market participant can place a discretionary order on a displayed market linked to a reserve book and system for matching orders at the midpoint of the BBO such that the order must receive no worse than a specified price but is marketable within a range of prices. Where the midpoint of the BBO is within the discretionary range and where there is a contra order on the reserve book, the discretionary order is matched with the contra order.

According to another embodiment of the invention, an order placed on a displayed market can be routed out to another exchange if the BBO is better on the other exchange. According to another embodiment of the invention, an order placed on the displayed market includes an instruction that it is not to be routed out to another exchange.

According to another embodiment of the invention, a displayed market is linked with a system for matching orders at the midpoint of the BBO and a reserve book and an order placed on the displayed market includes an instruction not to match the order at the midpoint of the BBO with a contra order on the reserve book.

Another embodiment of the present invention relates to an automated system for matching orders to buy and sell securities at the midpoint of a BBO. The system includes executing a matching algorithm to match executable orders and maximize tradable volume. The matching algorithm checks each order and response in the database and determines which orders and responses are eligible to be matched, taking into account the prevailing BBO at any point in time and conditions or limitations attached to eligible orders, including boundary prices. The matching algorithm matches eligible orders in strict priority based on each eligible order's priority level, respecting time priority at each level, until reaching the first instance in which an order cannot be matched in its proper priority. If an order is reached that cannot, in proper time sequence, be filled in its entirety due to an order qualifier (such as minimum size or AON), the matching algorithm determines a portion, typically the maximum number of shares that can be executed, and executes the trade for that number of shares.

Another embodiment of the invention relates to an automated system that matches orders to buy and sell securities at the midpoint of a BBO linked with a displayed market where orders to match at the BBO midpoint are stored on a hidden reserve book where orders on the displayed market are matched against orders on the reserve book according to a priority scheme.

Another embodiment of the present invention relates to an automated system for matching orders to buy and sell securities at the midpoint of a BBO. The system includes receiving transaction data indicative of a proposed transaction, identifying a priority status and a period of time that is associated with the transaction data, and storing such data in a database. If applicable, the system transmits the selected message data to one or more market participants. Preprogrammed response data is provided in response to the transaction data, the preprogrammed response data being a function of a previously authorized response. A matching algorithm is executed, and executable orders are matched as a function of the transaction data and the response data.

Yet another embodiment of the present invention relates to an automated system for matching orders to buy and sell securities at the midpoint of a BBO. The system includes receiving transaction data indicative of an order and a price of a proposed transaction. A period of time is established during which the proposed transaction may be executed, and transaction data is stored in a database. A priority status is identified that is associated with the transaction data. Message data is provided to one or more participant systems, the message data is indicative of a portion of the transaction data, the period of time and the priority status. Preprogrammed response data is received from the one or more participant systems in response to the message data. The preprogrammed response data is a function of a previously authorized response. A matching algorithm is executed, and executable orders are matched as a function of the transaction data and the response data.

Yet another embodiment of the present invention relates to an automated system for matching orders to buy and sell securities at the midpoint of a BBO. The system includes receiving transaction data indicative of a proposed transaction. Time data indicative of a period of time during which the proposed transaction may be executed may also be received. A priority status that is associated with the transaction data is identified. All such data is stored in a database. Preprogrammed response data is provided in response to the transaction data, the preprogrammed response data being a function of a previously authorized response. A matching algorithm is executed, and executable orders are matched as a function of the transaction data and the response data.

Yet another embodiment of the invention relates to market participants who send orders to a server from a participant system. Each order is of a particular type. Reserve orders are orders where the customer simply identifies an instrument, whether they want to buy or sell the instrument (side), the quantity of the instrument to buy or sell (size), and the price they are willing to accept for the transaction. This price can be the market price. SOI orders include, in addition to the information for reserve orders, instructions for the disclosure of certain information to other market participants. This information typically includes the symbol, and may include the side, or size of the order, the price and/or the identity of the market participant. The order can also be an RFC order. An RFC order may include the same information as an SOI order. According to this embodiment, orders are matched with one another by the server. Priority is established among the orders as follows. RFC orders are given the highest priority. Next, SOI orders are given priority. Finally, Reserve orders are given priority. A drip feed (DF) order is a conditional Reserve order. Among RFC orders, the RFC orders where the most information is provided to market participants is given the highest priority. For example, RFC orders that disclose symbol, side and price are given priority over RFC orders that disclose just symbol. Among RFC orders that disclose the same amount of information, priority is assigned based on the time the order is received by the server. Priority among SOI orders is established in the same manner as priority among RFC orders. Reserve orders are given priority based only on the time the order is received.

BRIEF DESCRIPTION OF THE DRAWINGS

The present invention will be understood more fully with reference to the drawings, in which like elements are identified with like reference numerals. The drawings are provided for the purpose of illustration and are not intended to limit the invention.

DETAILED DESCRIPTION OF THE INVENTION

This invention provides an automated system for matching orders to buy and sell securities at the midpoint of a BBO, wherein the automated system is adapted to (i) operate on a fully-anonymous and continuous basis, (ii) process multiple, computer-generated orders, of any size, transmitted by algorithmic, program, and other automated trading systems, (iii) automatically match multiple, executable orders according to a priority scheme, and (iv) execute a matching algorithm that maximizes tradable volume when an executable order can not be matched according to the priority scheme.

The present invention provides an automated system for matching orders to buy and sell securities at the midpoint of a BBO. According to one embodiment, a trading system is adapted to trade United States dollar denominated common stocks, ETFs and Trusts currently traded on the NYSE, American Stock Exchange ("AMEX"), and NASDAQ. Orders may be entered anonymously and, with the exception of SOI orders and RFC orders, will be hidden. Orders may be market or boundary-priced, but market orders in this context, unlike market order treatment on other exchanges, are executable at the NBBO midpoint and may rest on the reserve book awaiting a contra-side order that is eligible for execution. There is no external display of the reserve orderbook to members and there will typically not be a published BBO from an exchange.

Alternatively, it is also an embodiment of the present invention that there is an external display of the reserve orderbook to members and a published BBO.

The various features of the present invention are described herein. Specifically, the network environment of the present invention, Solicitation of Interest (SOI) orders, Request for Cross (RFC) orders, Reserve orders, a priority scheme, a matching algorithm and a maximization technique are described.

Network Environment for the Present Invention

Figure 1:
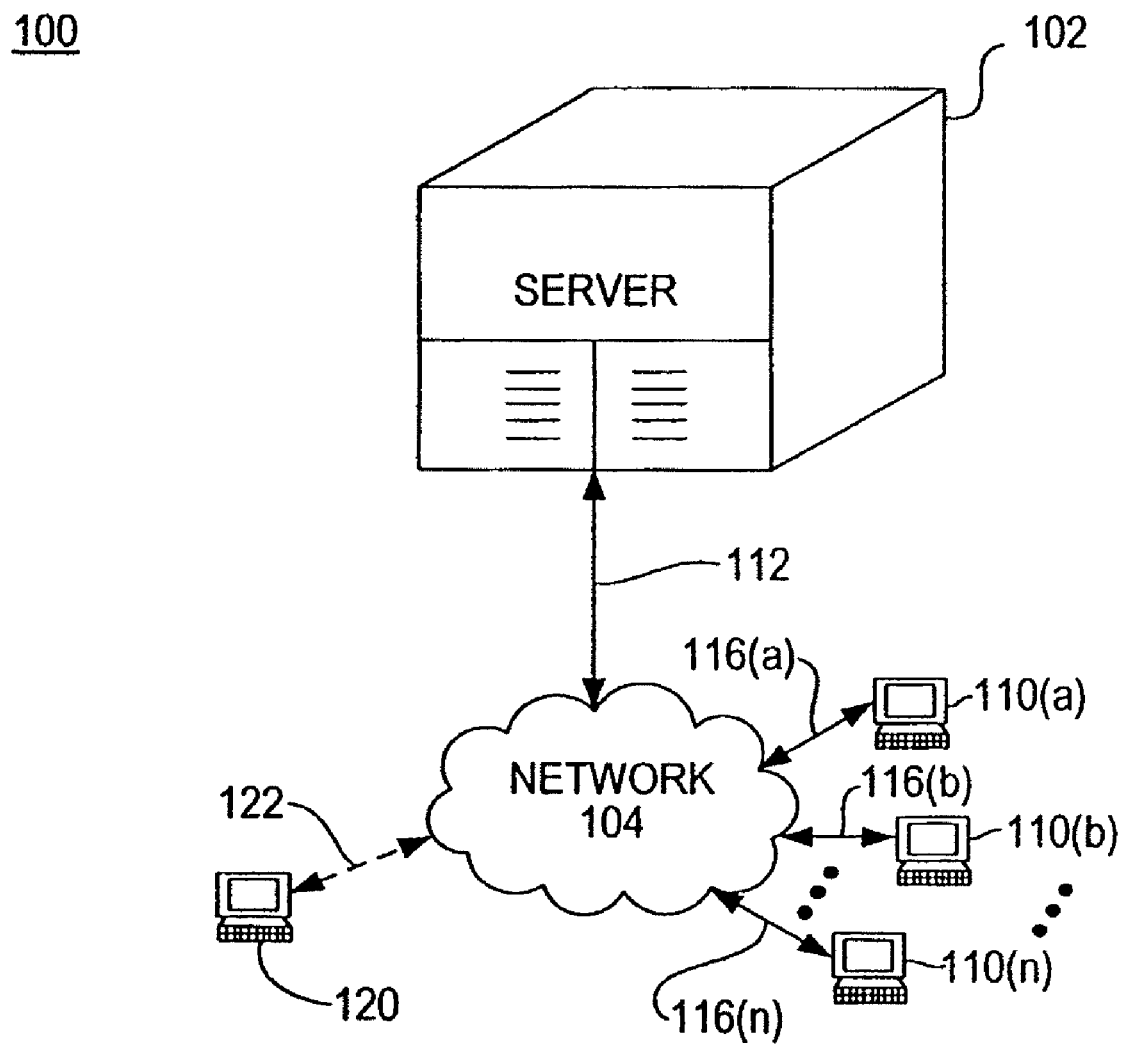
FIG. 1 shows a network environment adapted to support the present invention.

FIG. 1 shows a network environment 100 adapted to support the present invention. The exemplary environment 100 includes a network 104, a server 102, a plurality of communication appliances, or user locations, or participant systems, 110(a) ... (n) (where "n" is any suitable number) (collectively referred to herein as, participant systems 110) and one or more wireless participant systems, represented by wireless participant systems 120. Trading, transacting and executing orders occurs by the inter-operation of the components of network 100. For example, participant systems 110 are adapted and arranged to respond to orders generated by server 102. This response may occur as a result of preprogrammed instructions and typically occurs without intervention of an operator. Indeed, it is an embodiment of the present invention that messages transmitted from server 102 to participant systems 110 will not be visibly displayed on computer terminals.

The network 104 is, for example, any combination of linked computers, or processing devices, adapted to access, transfer and/or process data. The network 104 may be private Internet Protocol (IP) networks, as well as public IP networks, such as the Internet that can utilize World Wide Web (www) browsing functionality, or a combination of private networks and public networks.

Server 102 is operatively connected to network 104, via bi-directional communication channel, or interconnector, 112, which may be for example a serial bus such as IEEE 1394, or other wire or wireless transmission medium. Examples of wireless transmission medium include transmission between a modem (not shown), such as a cellular modem, utilizing a wireless communication protocol, or wireless service provider or a device utilizing a wireless application protocol and a wireless transceiver (not shown). The interconnector 112 may be used to feed, or provide, order data to server 102.

The terms "operatively connected" and "operatively coupled", as used herein, mean that the elements so connected or coupled are adapted to transmit and/or receive data, or otherwise communicate. The transmission, reception or communication is between the particular elements, and may or may not include other intermediary elements. This connection/coupling may or may not involve additional transmission media, or components, and may be within a single module or device or between one or more remote modules or devices.

The server 102 is adapted to access data, transmit data to, and receive data from, participant systems 110 and 120, via the network 104. Server 102 is described in more detail with reference to FIG. 2, herein.

Participant systems 110 and 120 are typically OMS's that reside on computers. They may be capable of processing and storing data themselves or merely capable of accessing processed and stored data from another location (i.e., both thin and fat terminals). These participant systems 110, 120 are operatively connected to network 104, via bi-directional communication channels 116, 122, respectively, which may be for example a serial bus such as IEEE 1394, or other wire or wireless transmission medium, as described herein. Participant systems 110, 120 are described in more detail in relation to FIG. 3, herein.

The server 102 and participant systems 110, 120 typically utilize a network service provider, such as an Internet Service Provider (ISP) or Application Service Provider (ASP) (ISP and ASP are not shown) to access resources of the network 104.

Figure 2:
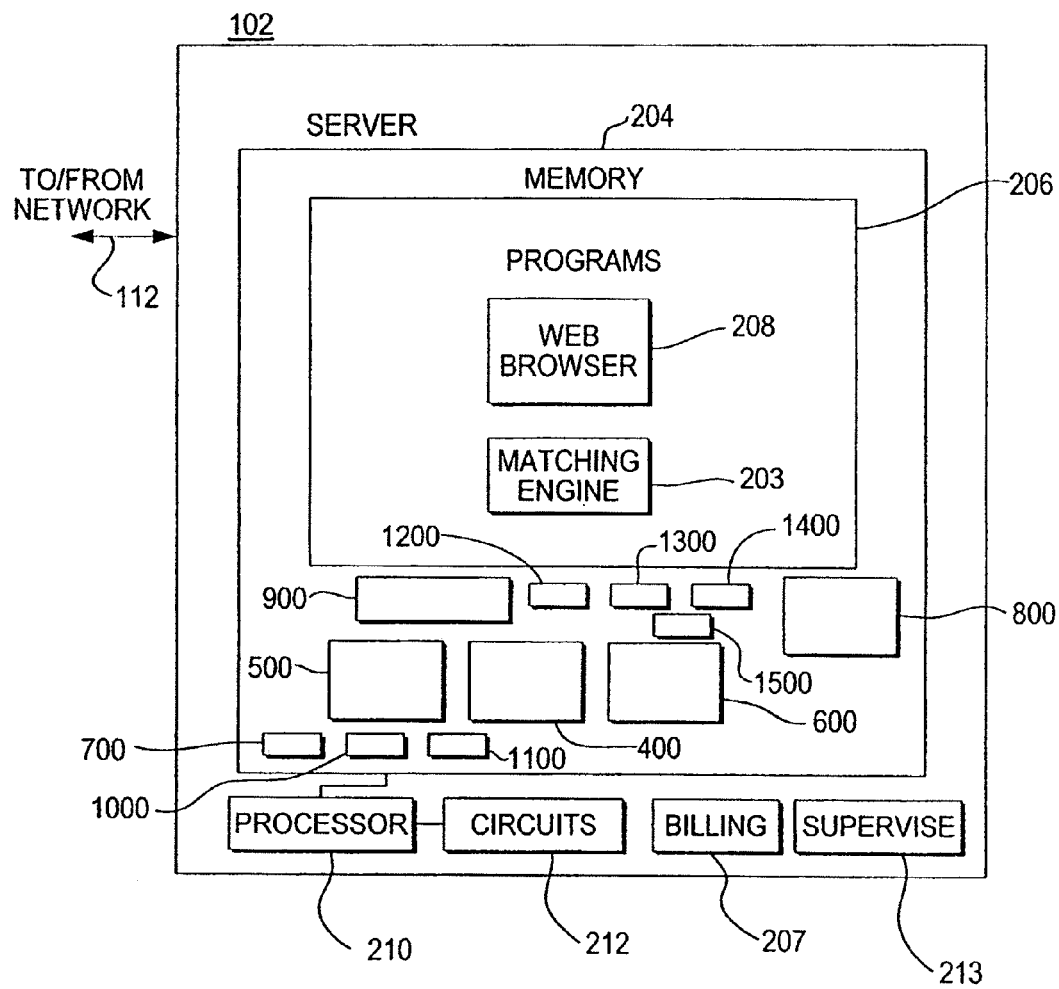
FIG. 2 illustrates a processing apparatus adapted to store and process data related to the present invention.

FIG. 2 illustrates that server 102, which is adapted to access, store and process data related to the present invention, is operatively connected to the network (shown as 104 in FIG. 1), via interconnector 112. Server 102 includes a memory 204, billing module 207, market supervisor module 213, processor 210 and circuits 212. The server 102 may also include integrated server management features and an interface that interacts and exchanges data with other terminals of network environment 100.

The server 102 is adapted to receive order data from participant systems 100 and store or process the data such that transactions can be executed. The server 102 is also adapted to provide data related to proposed transactions to other participant systems 100. For example server 102 can accept orders from participant systems in both CMS and FIX message formats. Orders may be delivered through a routing complex that has an appropriate platform and reports, summaries and/or invoices for transactions may be delivered to participant systems, or agents through the routing complex. The server 102 is also adapted to interface, via network 104, with one or more external trade reporting entities, such as another exchange such as NASDAQ or ADF (Automated Display Facility) for posting trades to CTS and UTDF. This functionality may utilize multiple interfaces depending on separation of information. Furthermore, the server 102 may deliver matched trades to DTCC for clearance and settlement as well as report quotes and trades to a securities information processor as well as store and provide audit information to an appropriate authority or regulatory agency.

Memory 204 may be, for example, dual hot-plug Ultra320 SCSI 3.5" hard drives, DDR-2 memory scalable to 12 GB that stores programs 206, which include, for example, a web browser 208, algorithms 400, 500, 600, 700, 800, 900, 1000, 1100, 1200, 1300, 1400 and 1500 as well as typical operating system programs (not shown), input/output programs (not shown), and other programs that facilitate operation of server 102. Web browser 208 is for example an Internet browser program such as Explorer™. These algorithms, or program code, 400, 500, 600, 700, 800, 900, 1000, 1100, 1200, 1300, 1400 and 1500 are each a series of steps for manipulating and executing transactions, which are typically stored on a computer-readable memory or medium and executed by a processor. These algorithms are discussed in more detail herein.

The memory 204 also stores matching engine, module or facility, 203, which is software, program code or algorithm, adapted to match bids and asks for financial instruments and access the NBBO midpoint for a particular instrument. The matching engine 203 facilitates transactions by determining transactions that that may be executed and when the transaction may be executed.

Billing module, or facility, 207 is typically software, program code or a series of steps adapted to track and accumulate trade confirmation or order cancellation or billing data for transactions that occur. This information may be transmitted to a party responsible for payment of the charges accrued. The transmission of the billing information may be electronic, for example transmitted utilizing the network described herein as element 104, or may be via the postal service as a written invoice.

Supervisor module, or facility, 213 is typically software, program code or a series of steps adapted to control and monitor transactions performed by server 102. This module 213 may also store and/or access market data indicative of the state or status of various markets which may be for example domestic markets and/or international markets. The market data accessed using network 104, as described in FIG. 1, herein.

Processor 210, which is operatively connected to memory 204, is used to access, process and manipulate the data retrieved and stored by server 102. The processor 210 is typically a microprocessor with sufficient speed and processing capacity to adequately perform the desired data manipulations of server 102. The processor 210 may be, for example, an Intel® Pentium® 4 Processor with Hyper-Threading Technology (3.6 GHz, 800 MHz FSB, 2 MB L2 cache).

Circuits 212 are operatively connected to processor 210 and typically include, for example, Integrated Circuits (ICs), ASICs (application specific ICs) power supplies, clock circuits, cache memory and the like, as well as other circuit components that assist in executing the software routines stored in the memory 204 and that facilitate the operation of processor 210.

Figure 3:
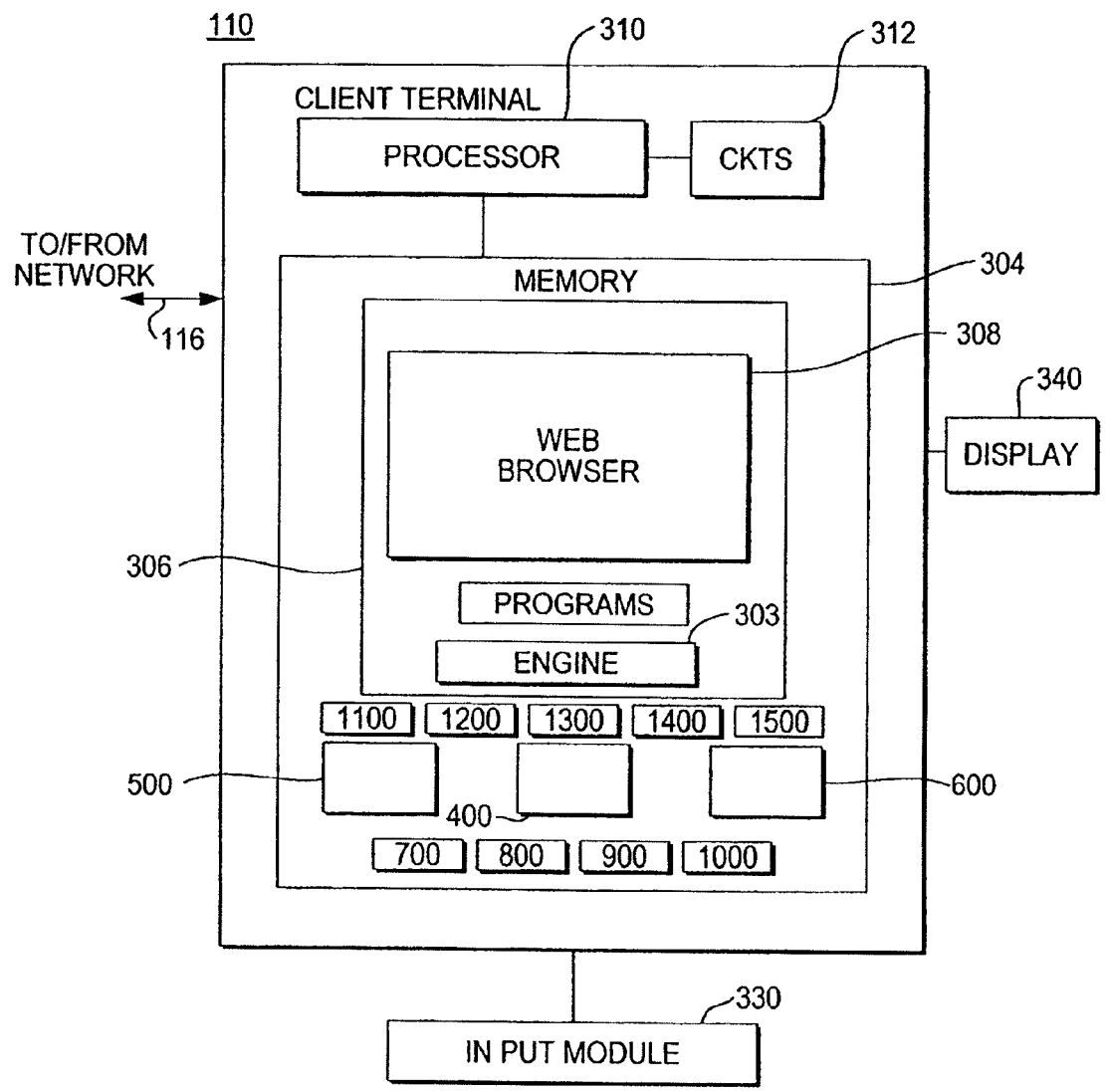
FIG. 3 illustrates an example of a communication appliance shown in FIG. 1.

FIG. 3 illustrates a participant system, user terminal, or communication appliance 110. Participant System 110 is typically an OMS that resides on a computer, laptop computer, PDA (personal digital assistant), wireless handheld device, mobile phone or other device capable of interfacing with a network, such as an IP network. The Participant System 110, may be for example, a Dell Precision 670 computer, which includes dual Intel® Xeon™ processor architecture with support for Intel® Extended Memory 64-bit technology, dual-channel ECC DDR2 system memory and Intel E7525 chipset with PCI Express (PCIe) graphics support. Participant System 110 also includes support circuitry 312, input module 330 and display module 340. Bi-directional interconnection medium 116 operatively connects the terminal 110 to the network (shown as element 104 in FIG. 1). The Participant System 110 is typically located at the user location.

Processor 310, which is operatively connected to memory 304, is used to process and manipulate the data retrieved, communicated and stored by Participant System 110. The processor is typically a microprocessor with sufficient speed and processing capacity. The processor may be, for example an Intel® Pentium® 4 Processor with Hyper-Threading Technology (3.6 GHz, 800 MHz FSB, 2 MB L2 cache). The processor 310 is operatively connected to circuitry 312. Circuitry 312 typically includes, for example, Integrated Circuits (ICs), ASICs (application specific ICs) power supplies, clock circuits, cache memory and the like, as well as other circuit components that assist in executing the software routines stored in the memory 304 and that facilitate the operation of processor 310.

Memory 304 stores programs 306, which include, for example, a web browser 308, as well as typical operating system programs (not shown), OMS programs (not shown), and other programs that facilitate operation of participant system 110. Web browser 308 is for example an Internet browser program such as Explorer™. Algorithms, or program code, or software, or executable code 400, 500, 600, 700, 800, 900, 1000, 1100, 1200, 1300, 1400 and 1500 are a series of steps, typically executed by a processor such as, for example, processor 310, to manipulate selected image data from the participant system. These algorithms are discussed in more detail herein.

Input module 330 is, for example, a keyboard, mouse, touch pad, track-ball, menu having soft-keys, or any combination of such elements, or other input facility adapted to provide input to participant system 110.

Display module 340 is, for example, a monitor, LCD (liquid crystal display) display, GUI (graphical user interface) or other interface facility that is adapted to provide or display information to a user.

Overview of Types of Orders, Order Execution and Determination of Priority

This invention provides an automated system for matching orders to buy and sell securities at the midpoint of a BBO, wherein the automated system is adapted to (i) operate on a fully-anonymous and continuous basis, (ii) process multiple, computer-generated orders, of any size, transmitted by algorithmic, program, and other automated trading systems, (iii) automatically match multiple, executable orders according to a priority scheme, and (iv) execute a matching algorithm that maximizes tradable volume when an executable order can not be matched according to the priority scheme. The orders include SOI orders, RFC orders, RFC responses, DF orders, and reserve orders. Each order has an assigned priority status, which may or may not be changed over time, and the execution of the order is a function of the priority status of the order. A brief overview of SOI orders, RFC orders, RFC responses, reserve orders, and DF orders including priority of execution follows.

Summary of SOI Orders

An SOI order typically has a predetermined quantity, side, priority and "lifetime", or viable transactional period, in which the order may be transacted. This lifetime determines a period which the SOI order has priority. Upon expiration of the lifetime, if the SOI order has not been transacted, it will convert, or be changed into, a reserve order.

Upon expiration of the lifetime, if the SOI order was submitted as an IOC, or "immediate or cancel" order, the SOI will expire, without being transacted.

Typically, an SOI order that has been converted to a reserve order will have an entry time in the reserve book as of the time the order was placed as an SOI order. Alternatively, an SOI order that is converted to a reserve order may have an entry time in the reserve book as of the time the SOI was converted.

SOI orders have the special characteristic that a broadcast notification will be disseminated to other participant systems upon entry of SOI orders into the system. SOI orders can be Market or Limit orders. SOI limit-priced orders are validated to ensure execution eligibility. If ineligible, SOI orders are rejected. The system parameters allow the choice of one of the following two methods to determine execution eligibility, based on the limit price of the order: at the midpoint of the NBBO or better, or at the NBBO price or better (ask for buy orders and bid for sell orders). SOIs are always eligible for execution immediately upon entry into the system and remain available for execution during their lifetime. SOI minimum size is determined by the SOI Minimum Size parameter, which must be at least as large as a round lot. SOI orders below the minimum size will be rejected. SOI orders time-in-force can be either DAY or IOC only. SOI fill-or-kill (FOK) orders are not allowed. Under an alternative embodiment of the invention, SOI FOK orders are allowed. SOI all-or-none (AON) orders are not allowed. Under an alternative embodiment of the invention, SOI AON orders are allowed. SOI sell short orders are not allowed. Under an alternative embodiment of the invention, SOI sell short orders are allowed. Each SOI order is classified as such for the duration of time from its arrival until the time lapse specified by the system SOI Life Time parameter. After that time period has elapsed, SOI orders that are Day orders are converted into standard Reserve Orders. SOI orders with a time-in-force of IOC remain eligible for execution during the entire time period set by the No_Cancellation Interval parameter, after which they expire. That interval can be less than or equal to the SOI Life Timer interval. SOI orders can be cancelled at any point in time after the expiration of the No_Cancellation Interval.

Summary of RFC Orders

RFC orders are similar to SOI orders except that RFC orders are not immediately executable because RFC orders have a delay period from the time the order is placed until it becomes viable and can be executed. This time period may be, for example, between 1 and 30 seconds, and typically between 2 and 10 seconds. The RFC order is typically sent as a single message. Other orders can only trade with the RFC order when the RFC is viable, i.e., after the delay period. While the delay period associated with a specific RFC controls execution of that specific RFC, other reserve orders are able to trade with each other prior to the time the specific RFC becomes viable. Typically RFC orders will be executed prior to SOI orders.

An RFC is one-sided, waits for a predetermined period of time for responses, then executes against responses and orders in the reserve book. This time period may be, for example, between 1 and 30 seconds, preferably between 1 and 3 seconds. However, this time period depends on the execution and data transfer speed of underlying computer systems and communications technology and according to another embodiment of the invention is less than 1 second. There can be multiple RFC orders being exposed at the same time within the same stock. When there are multiple RFCs being exposed simultaneously, they all terminate at the same time in an execution involving all eligible orders. The termination is based upon the time of the oldest RFC order. In an RFC Order, the symbol is always disclosed, optionally size and/or side, as specified by the exposure flags on the order. The system sends out exposure broadcast (RFC) then waits n seconds (parameter). The exposure period is a global parameter. RFC orders cannot be cancelled during the exposure period. There are 2 alternative order validations: 1. Buy orders must be at least as high as the ask; sell orders must be at least as low as the bid. 2. Buy orders must be at the mid-point or higher; sell orders must be at the mid-point or lower. Time validity can be day or IOC. Day RFCs will become reserve orders after the exposure period if they do not fully trade. The order is removed from the book and re-inserted into its regular reserve order priority. The order number is unchanged. IOC orders will be cancelled at the end of the exposure period if they do not fully-trade in the cross.

RFC Responses

When an RFC is broadcast, any participant can respond with an RFC Response Order. The RFC Response is a different order type with quantity and price. The RFC Response does not reference any particular RFC order. The response is not tied to a particular RFC order but will participate in the many-to-many matching at the end of the exposure period. Responses can be DAY or IOC, market or limit. Responses cannot be cancelled before the end of the exposure period. Responses cannot execute before the end of the exposure period. Limit-priced responses are not validated nor are they exposed.

At the end of the exposure period, if not fully executed, a response with day validity is changed into a standard reserve order and inserted into the book according to the time of entry of the response. The order number remains the same. An IOC response will be deleted. If the response is entered when there is no RFC in progress then the order is immediately processed as a reserve order. If it is an IOC then it will trade and the balance will result in an UROut'ed message to the participant system. If it is a day response then it is immediately inserted into the book as a DAY reserve order.

At the end of exposure period, the system attempts to execute at the midpoint using the standard matching function. Unexecuted portions of Day RFC orders and Day responses stay in book and are converted to reserve orders, retaining the same order-number. The priority is determined by the manner in which it is entered. Unexecuted IOC RFC orders and IOC responses expire, and the system sends the participant system an UROut'ed message after the exposure period.

There can be multiple RFCs occurring at the same time. When multiple RFCs all expire at the same time, the earliest one determines the time at which they all co-terminate. Both buy and sell side RFCs terminate at the same time and participate in an execution with all eligible orders. Responses are not directed to a particular RFC. At the end, all RFCs and Responses participate in an execution with all eligible orders including reserve and RFQ orders on the book.

Summary of Reserve Orders

Reserve orders are entered into the system as the standard order type. Reserve orders are available for immediate execution. Upon entry, and thereafter, reserve orders will attempt midpoint matches against contra-side orders. If reserve orders have no special qualifiers and are not immediately executed, they are placed into the reserve book as day orders. Reserve orders can be market or limit orders. Reserve orders must have a minimum quantity size of one round lot. Reserve orders can be cancelled at any point in time.

Reserve orders can have two time-in-force qualifiers—IOC and FOK. The immediate-or-cancel qualifier exposes the order to determine if there are contra-side orders against which it can be executed. Any round lot quantity that can be executed is then executed at the midpoint, and the remainder is returned to the sender as an UROut quantity. The fill-or-kill qualifier exposes the order to determine whether there are contra-side orders against which it can be executed at the midpoint and in its entirety. It is either executed in its entirety or returned to the sender as a UROut.

Reserve orders are also eligible to have one execution instruction—AON. An all-or-none order can be entered into the system's reserve book. It will be eligible for execution at any time when executable contra-side orders exist. To the extent that it cannot be fully executed, it will remain eligible for subsequent executions.

Summary of DRIP Feed (DF) Orders

A DF order is used to enter order sizes larger than the quantity that an order originator wants executed in a short time period. The DF serves as a control mechanism to limit the size per unit time that can be executed. Its primary benefit is to allow a single order to emulate the placement of multiple small orders at periodic intervals. The DF order can have conditions attached to it, or it can just use the default parameters.

The DF is an additional condition on a regular reserve order. An order with the DF condition attached to it contains instructions for inserting portions of that order over a given time interval. According to a given frequency, the system should feed the market with one order portion at a time, i.e. a calculated portion of an order will be entered into the book and will be available for matching. As a result of partial feeding, a large order may have many partial executions over a trading day. If the DF order is submitted without any parameters, the DF order will use the default parameters and calculate the number of full intervals between the time of entry and the close of the trading day.

An incoming and validated DF order will trigger the timer related to the time interval value defining frequency of order portions entering the reserve book. The DF timer is set for each DF order. Upon order entry the timer is initiated and the first order portion is submitted. After expiry of the timer it will be restarted unless the last portion has been inserted or the order has been entirely executed.

If a reserve order has instructions for inserting portions of the order over a given time interval, it will help to fulfill requirements by some firms to trade orders over the course of a period of time or the entire day, avoiding the execution of big portions of orders at any one time.

In essence, the system divides order quantity by number of complete time intervals to end of day and submits one portion (slice) to the market every "X" minutes, where X represents a quantity, such as 5 minutes. The final period may exceed X minutes and will encompass any remaining time to the close of trading (i.e., 16:00 EST). The number of complete time intervals is counted as the number of full intervals where the last one finishes at or before 4:00. There will be a unique timer set for each order, meaning that each order independently times the intervals. To the customer it appears as one order that has many partial executions over the day. The order cannot be split into odd lots. The order portions must always be a multiple of the round lot. Drip feed orders are reserve orders and can be cancelled at any time.

Three optional variables may be entered on a reserve order that can be used to instruct the system how to feed the order into the system: number of intervals (default is number of intervals to end of day); time interval—how often the available quantity should be reviewed (default is a pre-set global parameter); and catch-up—can be yes or no (default is no for catch-up). The catch-up parameter instructs the system to add additional quantity if a time interval lapses without an execution. If the catch-up parameter is not set, then exposure is limited to one slice at any time.

The participant may optionally specify, by order, the number of intervals that should be used to calculate the slice size. If not specified, the system will determine the number of intervals remaining between entry time and the end of the trading day, which is normally 4:00. The participant can optionally specify the length of each interval. If they do not, it will default to the global parameter for default interval length.

If Catch-Up is specified, then at each interval, divide the remaining quantity into the number of remaining intervals. Round up to the nearest round-lot, ensuring that it does not exceed the total quantity. If the total quantity is exceeded, then round down. If Catch-Up is not specified, then determine if the slice size is rounded up or down. If (Total-Quantity/ Number Of Intervals) Rounded-down*Number of Intervals>=Round-lot size, then round up is permitted. Otherwise, it is not permitted. Without Catch-up, the Maximum-Slice-size is Total-Quantity/Number of Intervals, rounded up only if round-up is permitted. The slice size cannot exceed the remaining quantity of the order.

If a period should elapse without the quantity fully trading then a UR Out should be sent immediately for the amount that did not trade.

Order Processing

Unlike standard market orders that trade at the NBBO, a buy market order according to the present invention would trade with a sell market order at the NBBO midpoint price. Executions will be in round lots (for example, 100 shares) and any odd lot portion of an order will be cancelled when the first execution report is issued (or the order is cancelled). A notification will be sent to the participant.

For a sell short order to be executable, short sale rules, if applicable, must be observed. Under an alternative embodiment of the invention, short sale rules are not observed. Under those rules, if an order is not executable, it is ignored until a favorable tick is calculated. Also, trades may be expressed in half-cent increments at or above the minimum price. The Max Decimals_in_Trade variable defines the maximum number of decimal positions in the execution price. The system provides execution reports with 2 decimal positions, or one cent, whenever possible. If the midpoint price is expressed in 3 decimal places (0.015, 025 etc.), the report will be expressed in 3 decimal places, or to one-half of a cent. It should not exceed the Max_Decimals_in_Trade.

As will be described in more detail herein, the following is an overview of a process flow for executing an order, validation, NBBO execution and post-trade processing according to the present invention. Orders are entered anonymously, acknowledged upon arrival and time stamped. Orders are then typically assigned a unique identification number. If there are no opposing orders stored on the reserve book that match incoming orders, market orders and boundary orders with a valid time-in-force will remain on the reserve book. (The reserve book is a record of all orders received that have not been fully executed, cancelled or rejected. Stated differently, orders reside on the reserve book until they are cancelled, matched, or expired.) Orders may include instructions for how a buyer or seller wishes the order to be handled. For example, the order may be an SOI order or an RFC order. These types of orders will be discussed more fully below. The order may include an All-or-None (AON) instruction to be executed in its entirety or else cancelled. It may include an Immediate-or-Cancel (IOC) instruction and must be executed, fully or partially, immediately upon receipt and then any unexecuted quantity must be cancelled. It may include a Fill-or-Kill (FOK) instruction and like an IOC order must be executed immediately. But an FOK order must be fully executed or else cancelled.

If there are opposing orders on the reserve book, but there is insufficient size to complete an incoming AON order, the matching algorithm, as discussed herein, will execute the AON order maximizing the tradable volume. That is, when an AON cannot be executed in its proper time priority, then the maximization algorithm is invoked, in which case any given AON order may or may not be executed, regardless of its time position in the reserve book. Market day orders and boundary day orders, or portions of orders, as well as orders bearing the AON execution instruction will reside on the reserve book. Neither FOK nor IOC orders reside on the reserve book.

When orders are executed trade reports are generated and provided to the trade participants.

Matching Solicitation of Interest (SOI) Orders

Figure 4:
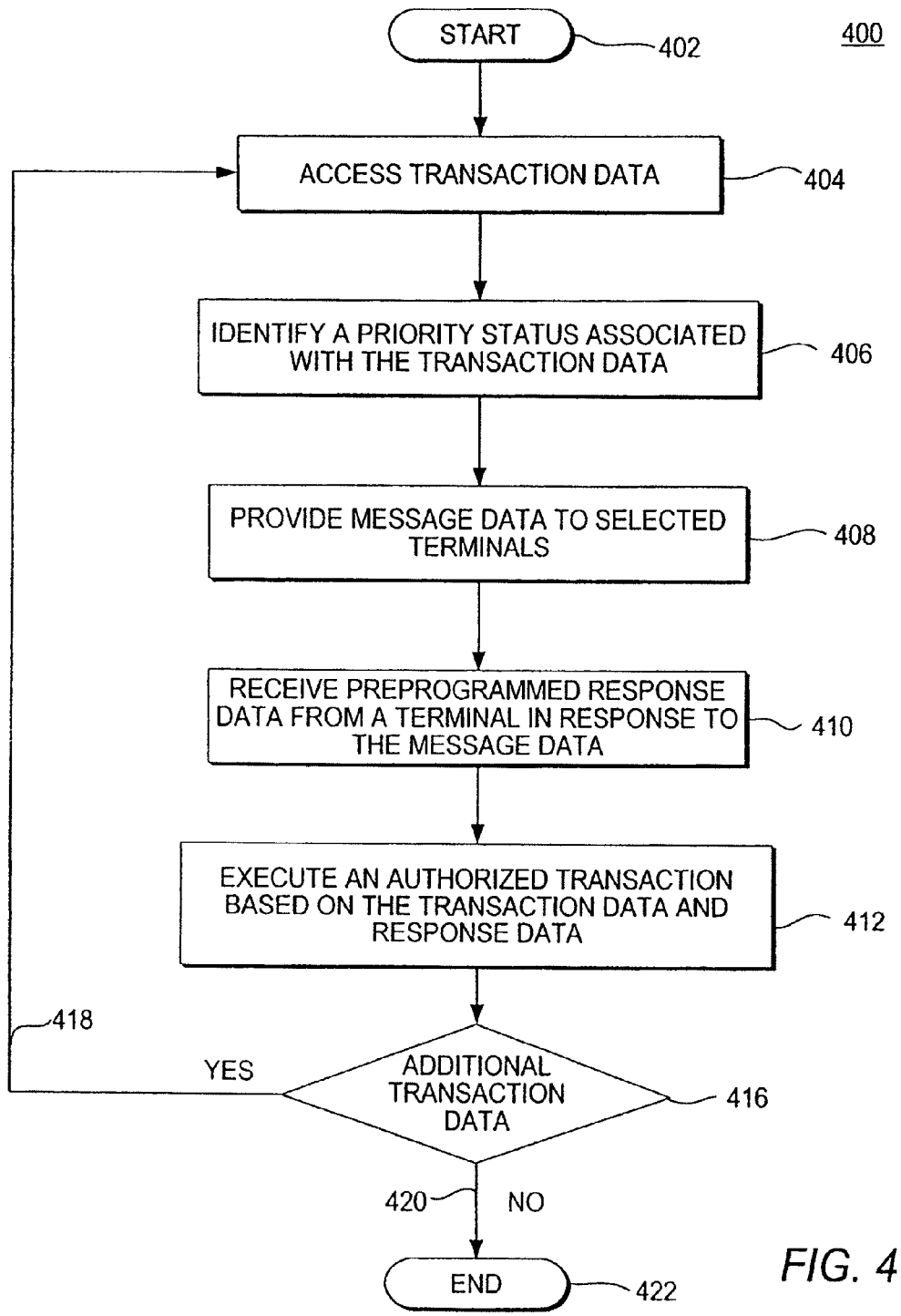
FIG. 4 is an algorithm, executable at a server apparatus, for performing a transaction according to the present invention.

FIG. 4 is an algorithm, executable at a server apparatus, for matching an SOI order, according to the present invention. As shown in FIG. 4, algorithm 400 is a series of steps, program code, or software, typically stored on a computer-readable medium that may be executed at a server, or other processing device to implement the present invention. As shown in FIG. 4, execution of the algorithm begins with step 402. Transaction data is accessed in step 404. The transaction data typically includes, for example, data identifying an instrument, such as a stock, and a quantity of the instrument that is to be exchanged, sold or purchased. The transaction data will also include an instruction identifying what information will be disclosed to other market participants. Such information may be only the identity at the instrument (i.e., its symbol) or may include the side (buy or sell), size, or price. According to a further embodiment of the invention, the identity of the person or entity placing the order may be disclosed. A priority status associated with the transaction data is identified in step 406. The priority status may be based on the amount of information that the person or entity placing the SOI instructs to be disclosed. According to an embodiment of the invention, SOIs that disclose a symbol, side or size, and price are given the highest SOI priority. Those SOIs that disclose only symbol, or other limited information, are given the lowest SOI priority.

Message data corresponding to the transaction is provided to selected participant systems in step 408. The message data may be, for example, the instrument that is to be exchanged, a quantity of the instrument, whether the order is to buy or sell, the price of the instrument, and the buyer or seller identity according to the instructions of the buyer or seller. The message data is provided to one or more participant systems, as described herein. The participant systems selected may have a pre-established relationship with the message provider, or may be associated with an electronic address that is authorized to receive the message data. Also, the participant systems may be subscribers to a service. The message data may not be displayed by the participant system. However, it is also an embodiment that the message data is displayed on a display screen or other user interface of the participant system.

A response to the message data, which may be a preprogrammed response, is received at the server as shown in step 410. The response is typically generated by a participant system processor and transmitted via the network to the server. Due to the limited time frame, the participant systems are typically preprogrammed to generate a response based on received messages. Thus, as shown in step 412, an authorized transaction is executed at the server based on the transaction data and the response data.

Step 416 determines whether additional transaction data is available to be accessed. If so, yes line 418 leads to step 404, which shows that transaction data is accessed. If no, line 420 leads to end step 422.

Figure 5:
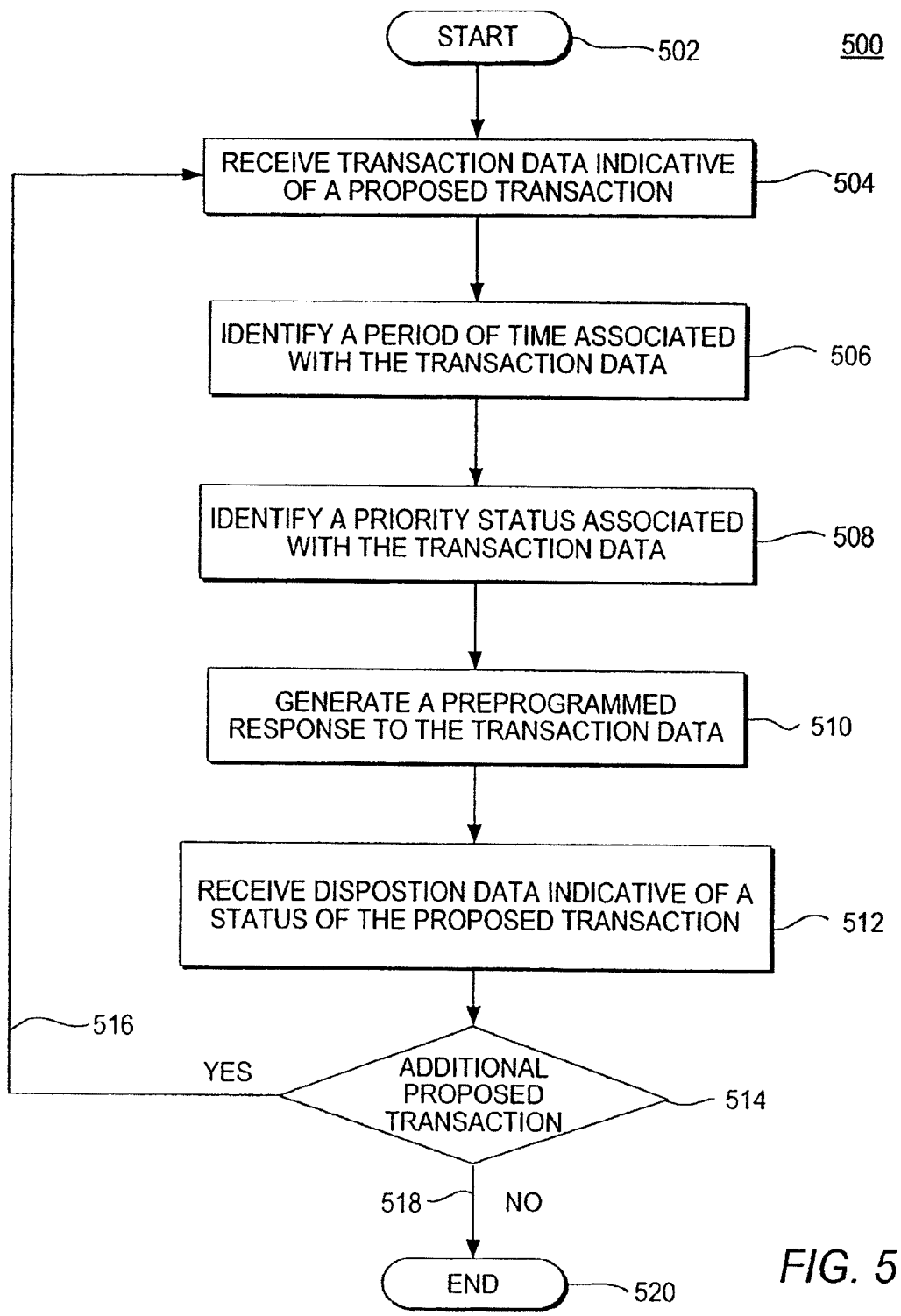
FIG. 5 is an algorithm, executable at a communication appliance, for performing a transaction according to the present invention.

FIG. 5 is an algorithm, executable at a communication appliance, for matching orders according to the present invention. As shown in FIG. 5, algorithm 500 is a series of steps, program code, or software, typically stored on a computer-readable medium that may be executed at a participant system, or other processing device to implement the present invention. As shown in FIG. 5, execution of the algorithm begins with step 502.

Transaction data is received at the participant system, in step 504. The transaction data is typically transmitted from a server, as described herein, and includes, for example, data identifying an instrument, such as a stock and a quantity of the instrument that is to be sold or purchased. The transaction data may also include time data that indicates a period of time for which the transaction is viable or available to execute, as shown in step 506. If the transaction is not completed prior to the period of time elapsing, the transaction is voided. A priority status is identified and associated with the transaction data, as shown in step 508.

A response to the transaction data, which is typically a preprogrammed response, is generated at the participant system and transmitted to the server, as shown in step 510. Due to the limited time frame, the participant systems are typically preprogrammed to generate a response based on received messages.

The server, as shown in FIG. 2, then acts upon the response and disposition data (either a message containing a trade confirmation or a URout) is received at the participant system indicative of the status of the proposed transaction, as shown in step 512. This disposition data may include notification that the proposed transaction occurred or that the proposed transaction did not occur and when the proposed transaction did not occur, a reason or explanation; such as the time elapsed, the prices did not match, or other information that explains the status of the proposed transaction.

Step 514 determines whether additional transaction data is available. If so, yes line 516 leads to step 504, which shows that transaction data is received at the participant system. If no, line 518 leads to end step 520.

Figure 6:
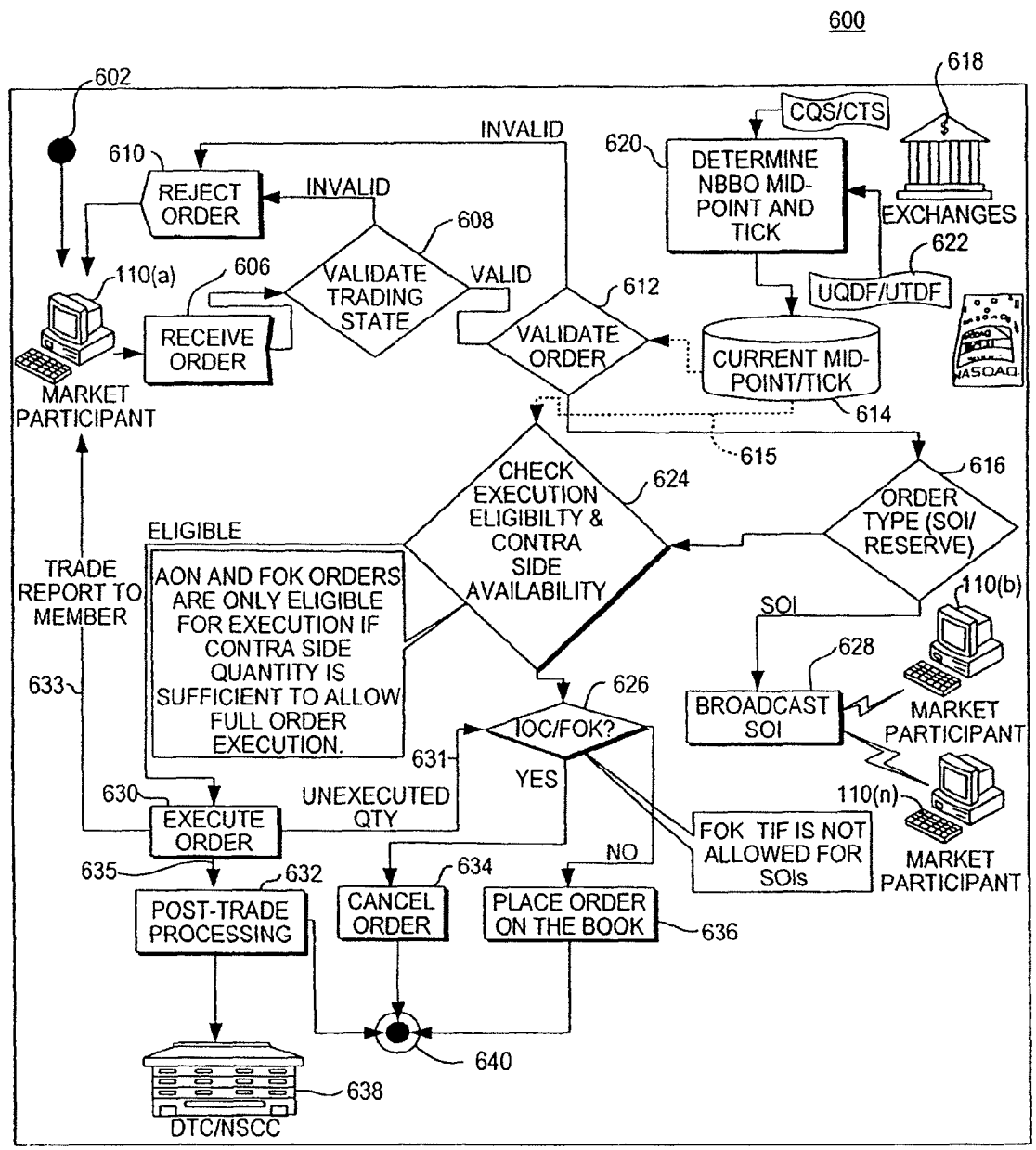
FIG. 6 is a diagram illustrating an example of a process flow of order, validation NBBO execution and post-trade processing according to the present invention.

The process for handling reserve orders that are not SOI or RFC orders is illustrated in FIG. 6 and begins with start step 602. A market participant, operating participant system 110(*a*) generates an order request. Step 606 shows that the order is received, typically at the server apparatus, as described herein. The trading state is validated in step 608.

If the trading state is not valid (i.e., the instrument is not available for trading), the order is rejected, as shown in step 610. If the trading state is valid, the order is validated as shown in step 612. The order validation step uses a current NBBO midpoint/tick, which is retrieved, or accessed, from storage, or memory 614. The current midpoint/tick is generated as a function of determination step 620, which determines the NBBO midpoint and tick based on data from exchanges 618 and UQDF/UTDF 622. If the order is not valid, the order is rejected as shown in step 610. If the order is valid, an order type is established in step 616. The order type may be, for example, an SOI, RFC, or reserve order.

If the order is an SOI or an RFC, a broadcast message is generated, as shown in step 628. This broadcast is provided to one or more participant systems, 110(*b*) . . . 110(*n*), which are market participants who may wish to respond to the SOI. SOI and RFC orders will be discussed more fully below.

Step 624 determines execution eligibility and contra side availability. If the order is not eligible for immediate execution, a determination is made whether the order is IOC and/or FOK, as shown in step 626. If the order is IOC/FOK, (immediate-or-cancel/fill-or-kill) the order is canceled, as shown in step 634. Following step 634, end step 640 is reached.

If the order is not IOC/FOK the order is placed in the reserve book, as shown in step 636. End step 640 is then reached.

If step 624 determines that the order is eligible, the order is executed, as shown in step 630. Line 631 shows that unexecuted portions of the order, or unexecuted quantity is processed as described in relation to step 626. Line 633 shows that a report of the transaction, or trade, is reported to terminal 110(*a*). Line 635 shows that post trading processing occurs, as shown in step 632. Part of the post trade processing may include a report or message to DTC/NSCC 638. Also, end step 640 may be reached following step 632.

SOI Order Eligibility Determination

Figure 12:
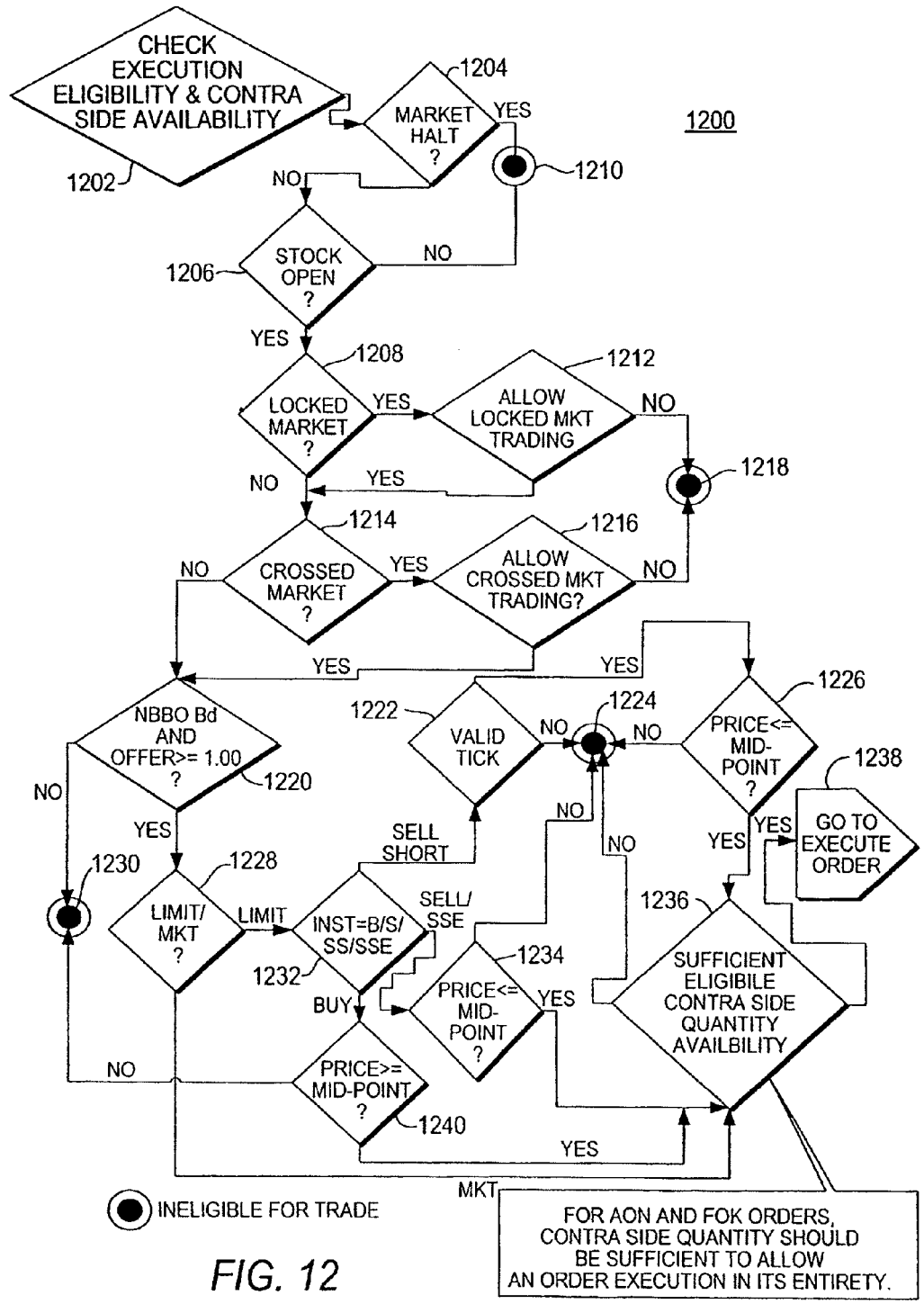
FIG. 12 shows an illustration of a procedure to check if a reserve SOI order is eligible for immediate execution upon arrival.

FIG. 12 shows an illustration of a procedure 1200 to check if a reserve or SOI order is eligible for immediate execution upon arrival. Step 1202 shows that the execution eligibility and contra side availability is checked. A determination of a market halt is made in step 1204. If so, end step 1210 is reached. If not a determination whether the instrument is open is made, as shown in step 1206, if not, end step 1210 is reached.

If the instrument is open (available to be traded), a determination is made of a locked market exists, as shown in step 1208. If so, a determination is made whether locked market trading is permitted, as shown in step 1212. If locked market trading is not permitted, end step 1218 is reached. If locked market trading is permitted, a determination is made of a crossed market, as shown in step 1214. Step 1214 may also be reached via step 1208.

If step 1214 determines that the market is crossed, step 1216 determines whether crossed market trading is permitted. If not, end step 1218 is reached. If cross market trading is permitted, step 1220 is reached. Step 1220 may also be reached if step 1214 determines that a crossed market does not exist. A comparison is made to determine whether the NBBO bid and offer are greater than or equal to one dollar, if not, end step 1230 is reached. If so, whether the order is a boundary and/or market order is determined in step 1228.

If step 1228 determines that it is a boundary order, step 1232 determines what action should be taken. If the order requires a sell short action, step 1222 is reached. A sell short action may require application of short sale rules. Furthermore, step 1222 determines whether the order can execute in view of the tick. If yes, step 1226 determines whether the price is less than or equal to the midpoint. If the price is not less than or equal to the midpoints, or it is not a valid tick, end step 1224 is reached. If the price is less than or equal to the midpoint a determination is made in step 1236 whether sufficient eligible contra side quantity is available. If yes, the order is executed as shown in step 1234. If not, end step 1224 is reached.

If step 1232 determines a sell/SSE order is in place, step 1234 determines whether the price is less than or equal to the midpoint. If not, end step 1224 is reached. If so, step 1236 is reached.

If step 1232 determines a buy order is in place step 1240 determines whether the price exceeds or is equal to the midpoint. If yes, step 1236 is reached. If not, end step 1230 is reached. Step 1238 follows step 1236 and shows that the order is executed.

Execution of Reserve Orders

Figure 7:
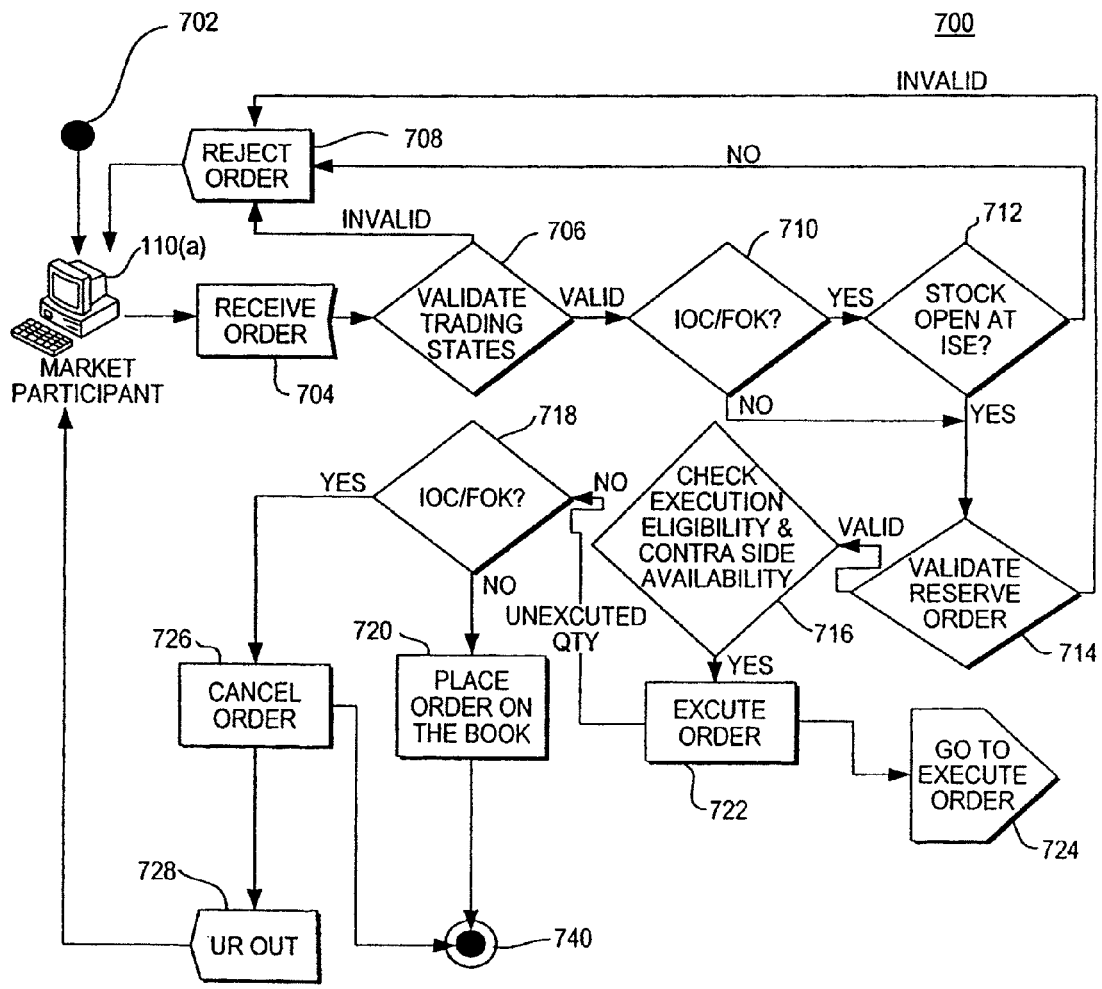
FIG. 7 illustrates an example of execution of a reserve order according to the present invention.

Referring back to FIG. 7, FIG. 7 illustrates an example of an algorithm 700 for execution of a reserve order according to the present invention. Reserve orders are typically entered without announcement (i.e., the arrival does not generate an announcement to participant system terminals) and may be boundary-priced or market priced. The reserve orders may have a valid time in force, such as day, IOC or FOK. AON reserve orders are typically not entered as IOC or FOK. Reserve orders are available for immediate execution.

The reserve order handling algorithm begins with start step 702. A market participant at a participant system 110(*a*) generates an order. Step 704 shows that the order is received, typically at the server apparatus, as described herein. The trading state is validated in step 706.

If the trading state is not valid, the order is rejected, as shown in step 708. If the trading state is valid, a determination is made whether the order is IOC/FOK, as shown in step 710. If the order is IOC/FOK, a determination is made whether previously received reserve orders for the instrument are available, as shown in step 712. If not, the order is rejected, as shown in step 708. If the instrument is open, that is, if corresponding orders to trade against the incoming order are stored on the reserve book, a determination is made whether the order is a valid reserve order, as shown in step 714. Step 714 may also be reached from step 710, if the instrument is not open. If the order is not a valid reserve order, the order is rejected, as shown in step 708.

If the order is a valid reserve order, execution eligibility and contra side availability is determined, as shown in step 716. If the determination of step 716 is affirmative, the order is executed, as shown in step 722.

If the determination in step 716 is negative, (or a "no" result) the unexecuted quantity may be executed as shown in step 722. Also, a determination of IOC/FOK is made in step 718.

If the order is not IOC/FOK, the order is placed in the reserve book, as shown in step 720. If the order is IOC/FOK, the order is canceled, as shown in step 726. A status report is provided to the participant system 110(*a*), as shown in step 728 and end step 740 is reached.

Execution of Orders Based on Type of Order

Figure 8:
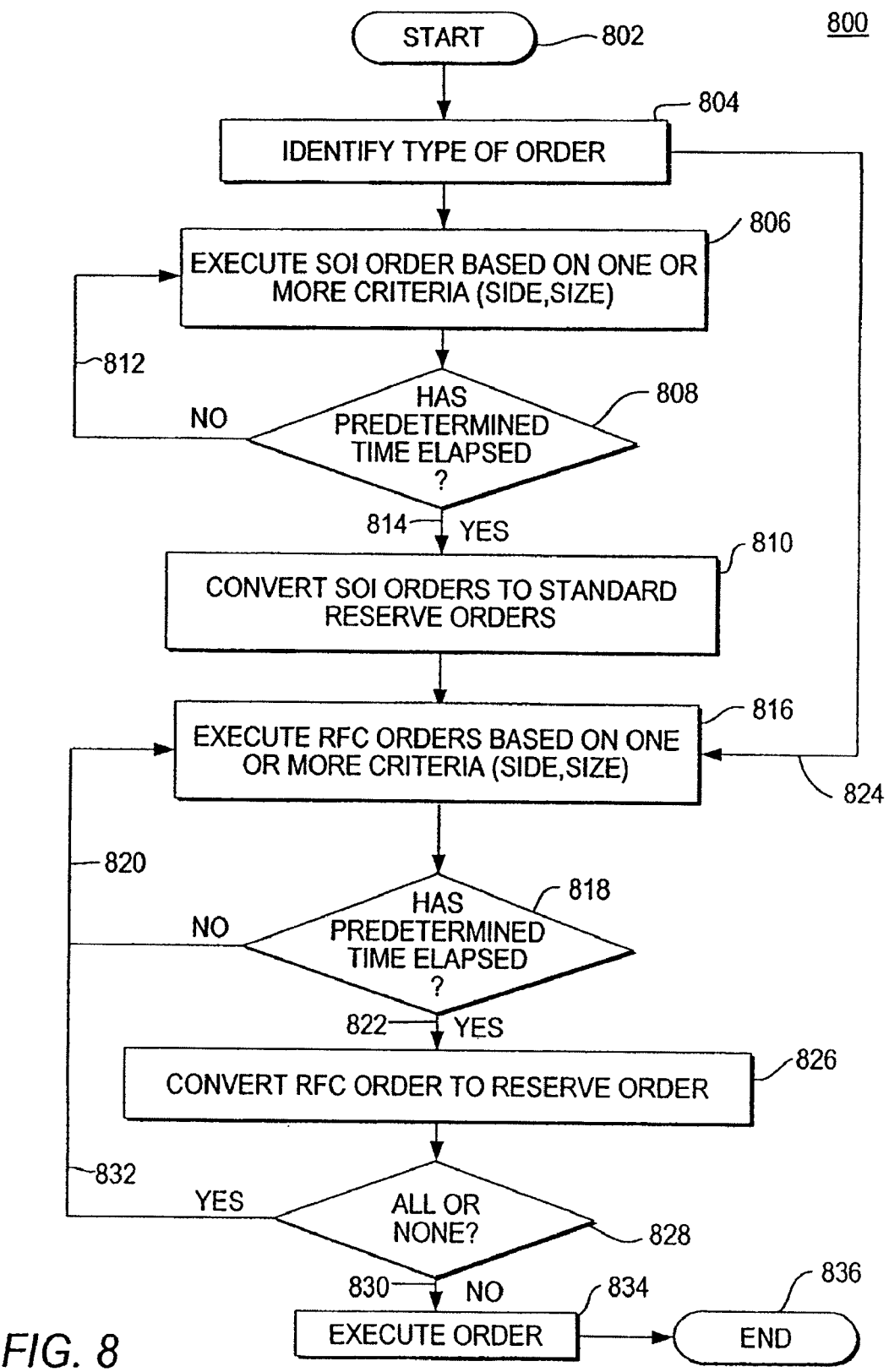
FIG. 8 is an algorithm, executable at a server apparatus, for performing a transaction based on parameters of the transaction.

FIG. 8 is an algorithm, program code, series of steps or software 800, stored on a computer-readable medium, that is executable at a server apparatus, for performing a transaction based on parameters of the transaction. The algorithm begins, as shown in step 802. The type of transaction, or order is identified in step 804. Based on whether the order is a reserve order, SOI or RFC, and based on instructions accompanying the order, a priority of order execution is established.

According to one embodiment of the invention, RFC orders are given priority over SOI orders. According to an alternative embodiment of the invention, SOI orders are given priority over reserve and RFC orders. Among SOI orders, priority is established based on the information broadcast to market participants. For example, SOI orders in which symbol, size, side and price information are broadcast are given priority over SOI orders where only symbol information is broadcast as shown in step 806.

A determination is made whether a predetermined time period has elapsed to execute the SOI order, as shown in step 808. If not, "no" line 812 shows that step 806 is repeated. If the predetermined period of time has elapsed, "yes" line 814 shows that SOI orders are converted to standard reserve orders, as shown in step 810. SOI orders are executed against previously stored reserve orders and responses received from market participants in response to the broadcast information.

After all SOI orders have been either executed or voided, for example due to elapsed time, the other types of orders may be executed, as shown in step 816.

Also, as stated above, if step 804 determines that the transaction does not include SOI orders, then line 824 leads to step 816, in which Request-for-Cross (RFC) orders are executed. Similar to SOI orders, RFC orders include instructions for broadcasting information to selected market participants. The RFC orders are executed based on one or more criteria, as shown in step 816. These criteria include, for example, the amount of information broadcast about the RFC order, whether the order is an ask or a bid (side), quantity of the order (size), identity of the buyer/seller and other criteria.

A determination of whether a predetermined time period has elapsed is made, as shown by step 818. If not, "no' line 820 leads to step 816, in which viable RFC orders are executed based on the criteria described herein. If the predetermined time period has elapsed, "yes" line 822 leads to step 826, in which non-executed RFC orders are converted into reserve orders. A determination is made in step 828 whether there are any all-or-none (AON) orders. If so, yes line 832 leads to step 816. If not, "no" line 830 leads to step 834, in which all valid orders are executed. The algorithm ends, as shown in step 836.

DRIP Feed

Figure 9:
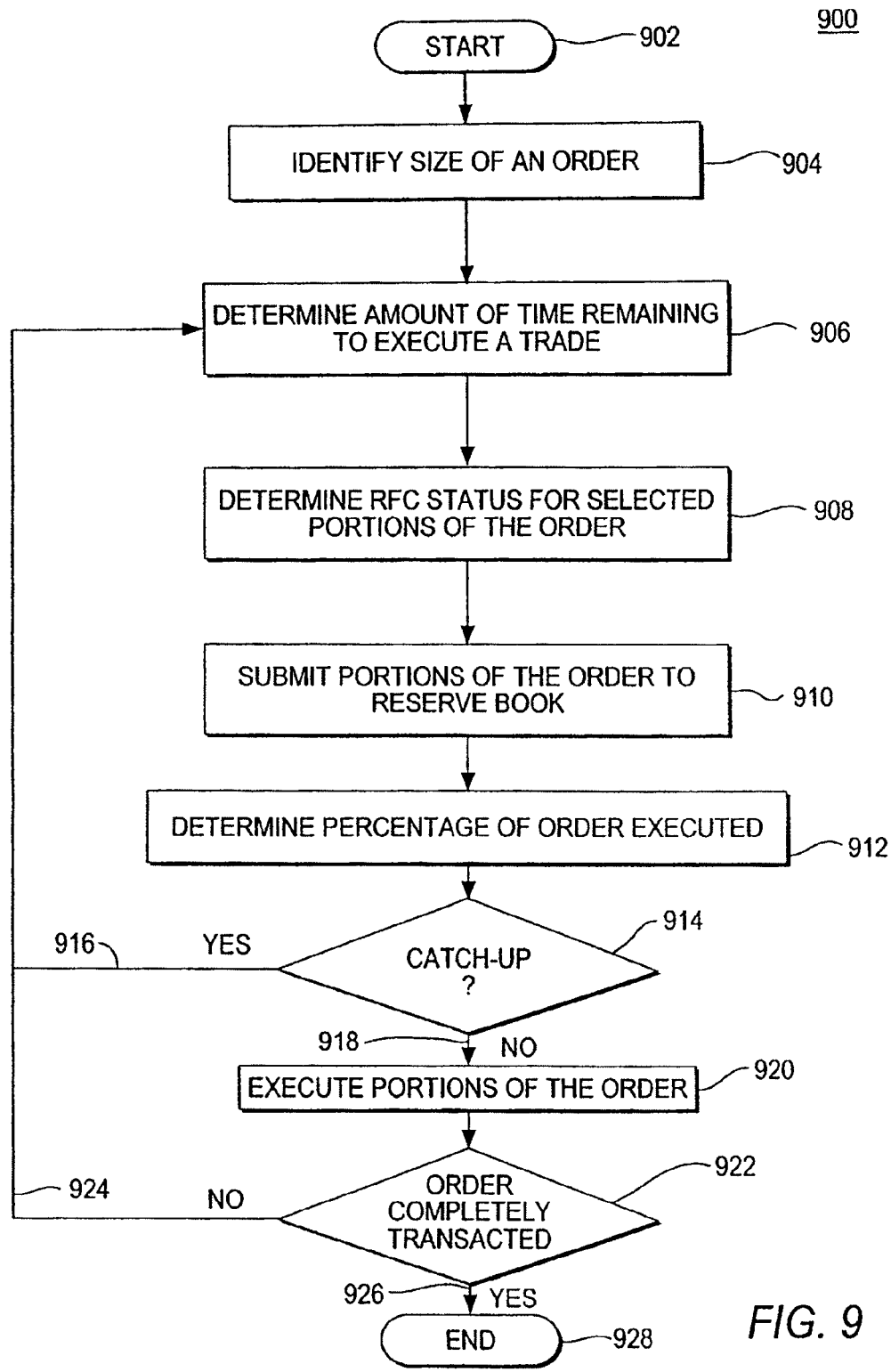
FIG. 9 is an algorithm, for performing a purchase (DRIP) transaction according to the present invention.

FIG. 9 is an algorithm, program code, series of steps or software 900, stored on a computer-readable medium, that is executable at a server apparatus and/or participant system, for executing an order according to the present invention. Algorithm 900 enables a single order to be executed as a plurality of smaller orders, thereby mitigating effects of the order on the market, such as price fluctuations and changes in demand for an instrument. The algorithm begins with start step 902. The size of the order to be exchanged, either bought or sold, is identified, as shown in step 904. An amount of time remaining in which the order may be transacted is determined in step 906.

A status, such as RFC, for selected portions of the order is determined in step 908. Portions of the order are submitted for transacting, or exchanging, as shown in step 910. For example, if an order to purchase 10,000 shares of a stock is received and there are five hours remaining in the trading day then, according to one embodiment of the invention, orders for 2,000 shares would be scheduled to be submitted each hour. This is typically accomplished by submitting portions of the order to the reserve book. Prior to submitting a subsequent portion of the order, the percentage, or portion or part, of the previously submitted order that has been executed is determined in step 912. A determination is made whether additional, or extra, portions of the order need to be added to the subsequent portion in order to "catch-up" the rate of executing transactions, as shown in step 914. If catch-up is necessary, "yes" line 916 leads to step 906. If catch-up is not necessary, "no" line 918 shows that pro rata portions of the order are executed, as shown in step 920. Decision step 922 determines whether the order has been completely transacted. If not, "no" line 924 leads to step 906. If the order has been completely transacted, "yes" line 926 leads to end step 928.

The process described in relation to FIG. 9 may be used as part of a transaction system as described herein, or as a distinct algorithm.

Execution of SOI Orders

Figure 10:
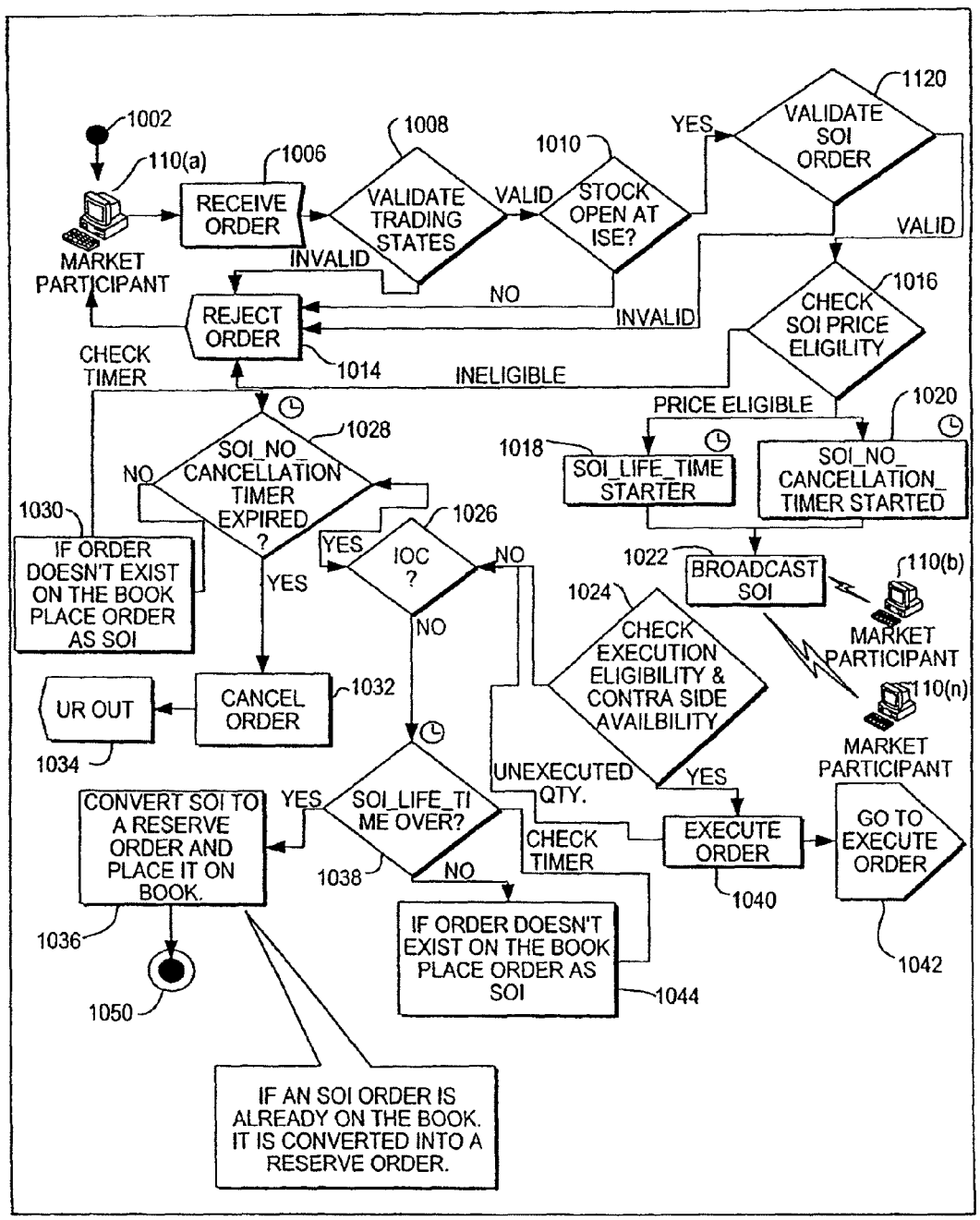
FIG. 10 illustrates an example of execution of an SOI order according to the present invention.

As described above, an SOI order may be executed as shown in FIG. 10. Specifically, FIG. 10 illustrates an example of execution of an SOI order according to the present invention. A transaction involving SOI orders may also have a priority scheme that determines a sequence or priority for action.

SOIs may execute immediately upon entry and they remain available for execution during their lifetime. SOIs typically have a minimum size defined by the SOI_Minimum_Size parameter, which is usually at least one round lot of 100 shares. If the SOI quantity is less than the allowed minimum, the order may be rejected with the error message.

SOI Time in Force is limited to DAY or IOC. FOK and AON instructions are not valid execution instructions for SOI orders and such orders will be rejected with an error message. Upon arrival of an SOI, a timer is started that is equal to the SOI_No_Cancellation Interval. The SOI_No_Cancellation interval is a global system parameter. According to one embodiment of the present invention, the value may be zero or a valid number of seconds. A non-zero value prevents an SOI order from being cancelled before the timer expires and a zero value means the order is not subject to a cancellation interval and can, therefore, be cancelled immediately.

SOI orders with a Time in Force=IOC remain in the reserve book for a minimum amount of time (unless matched) equal to the SOI_No_Cancellation_Interval. At the expiration of this interval, unexecuted IOC orders will be cancelled. SOIs may be entered to Buy or Sell. Sell Short Exempt orders may also be permitted. Sell Short Exempt orders, if permitted, are treated like standard Sell orders.

Sell Short SOI orders are not permitted and they are rejected with an error message. SOIs can be market or boundary priced. The SOI Boundary price is validated when the SOI order is received. According to one embodiment of the present invention, to be valid, the boundary price must either be 1) at the midpoint price or better 2) at the NBBO price (buy on the offer; sell on the bid) or better.

Orders that fail the SOI Price Validation will be rejected with an error message. If the order is to be priced at the NBBO, there is a unique message depending upon the side of the order—e.g. the order is a buy or a sell order. SOI Boundary orders that fail price validation are not entered into the reserve book. They are rejected.

The boundary price validation and the No_Cancellation_Interval, together, prevent users from manipulating the market by announcing large orders close to the market price and canceling them before they can trade.

SOI orders have execution priority over reserve orders. SOIs retain their execution priority over Reserve Orders for a specified period of time identified as SOI_Life_Time. The value is expressed in seconds. A zero life time value disables the SOI priority.

At the expiration of the SOI_Life_Time interval, an SOT DAY order will be converted into a Reserve Order, losing its SOI execution priority. It will retain its original order number and timestamp. There will typically not be a message sent to members alerting them of the order conversion. According to an alternative embodiment of the invention, an SOI may have its time of entry reset at the end of the SOI_Life_Time parameter.

If converted into a Reserve Order, the former SOI order will be stored in the order book among other Reserve Orders based on its original SOI timestamp. If an executable opposing Reserve Order is entered, eligible Reserve Orders submitted at an earlier time will be executed first.

There may be multiple SOIs in the same instrument simultaneously. They may be entered by the same participant. Each one will initiate its own SOI No_Cancellation_Interval and SOI_Life Time_timers.

Unlike the Reserve Order which is entered silently, the accepted SOI order causes a message to be broadcast to all enabled participants announcing its arrival and limited, user-specified terms of the order. The outbound SOI message will always contain the symbol and will optionally expose the side and/or size of the order based upon instructions passed with the order or maintained.

The outbound SOI message is typically distributed immediately upon arrival, regardless of whether the order is executed in part or in full.

SOIs can execute against Reserve Orders and other SOIs following priority rules. For example, it is also an embodiment of the present invention that orders are executed in priority sequence. SOI orders have execution priority based upon the variables exposed in the outbound SOI message. An SOI order with both quantity and side exposed (in addition to symbol) has the highest execution priority. SOI orders have priority over Reserve Orders during the SOI_Life_Time. At the expiration of the SOI_Life_Time interval, the order is converted to a Reserve Order and has Reserve Order priority from then on.

Each trade record should include the order category. If the order is executed while it remains an SOI, the order will be reflected as an SOI. If it is executed after it is converted to a Reserve Order, it will be reflected as a Reserve Order.

Execution reports are logged and time-stamped and given a unique execution ID. Even if pairs of orders exist that appear to match, for a trade to occur, they must be tradable at the NBBO midpoint price.

An SOI order with either quantity or side exposed (in addition to symbol) will be next in priority. There is typically no implicit priority of exposing side over size (or size over side). This is based strictly upon time. An SOI with only symbol exposed (neither side nor size) will have the lowest SOI priority. Within each order category, orders are executed in time priority.

There is no priority associated with market orders over boundary orders, no ranking of better boundary prices over lesser priced boundary prices nor ranking by Order Capacity (Agency vs. Principal vs. Riskless Principal). SOIs may only be entered when the stock is open. They are not allowed in pre-open or halted states.

An illustration of the execution at SOI order is provided by FIG. 10. The process shown as flowchart 1000, begins with start step 1002. Participant system 110(*a*) generates an SOI order. The order is received as shown in step 1006. The order is validated in step 1008. If the order is not valid, it is rejected as shown in step 1014. If the order is valid, a determination is made whether the instrument is open, as shown in step 1010, if not, the order is rejected. If the instrument is open, a determination is made whether it is a valid SOI order, as shown in step 1012. If not, the order is rejected. If it is a valid SOI order, price eligibility is checked in step 1016. If the SOI is price eligible, an SOI no cancellation clock is initiated, as shown in step 1020, and an SOI life-time timer is also initiated as shown in step 1018. Selected information about SOI is broadcast to participant systems 110(*b*) . . . 110(*n*), as shown in step 1022.

A determination is made of the execution eligibility and contra side availability, as shown in step 1024. If the determination is positive, the order is executed, as shown in step 1040 and step 1042.

If the determination of step 1024 is negative, the unexecuted quantity may be executed as shown in step 1040. Furthermore, an IOC determination is made, as shown in step 1026. If the IOC is negative, a determination of the SOI life time over is made, as shown in step 1038. If not, if the order does not exist on the book, the order is placed as an SOL as shown in step 1044. Also, the timer is checked.

If the SOT life time has expired, any unexecuted portions of the SOI order is converted to a reserve order and placed in the book, as shown in step 1036. End step 1050 is then reached.

If the outcome of step 1026 is affirmative, a determination is made whether the SOI no cancellation time has expired, as shown in step 1028. If not, if the order does not exist on the book, the order is placed as an SOI, as shown in step 1030. Also, the timer is checked.

If the determination in step 1028 is that the SOI no cancellation timer has expired, the order is canceled, as shown in step 1032 and a report is generated and provided to participants, as shown in step 1034.

NBBO Calculation

Figure 11:
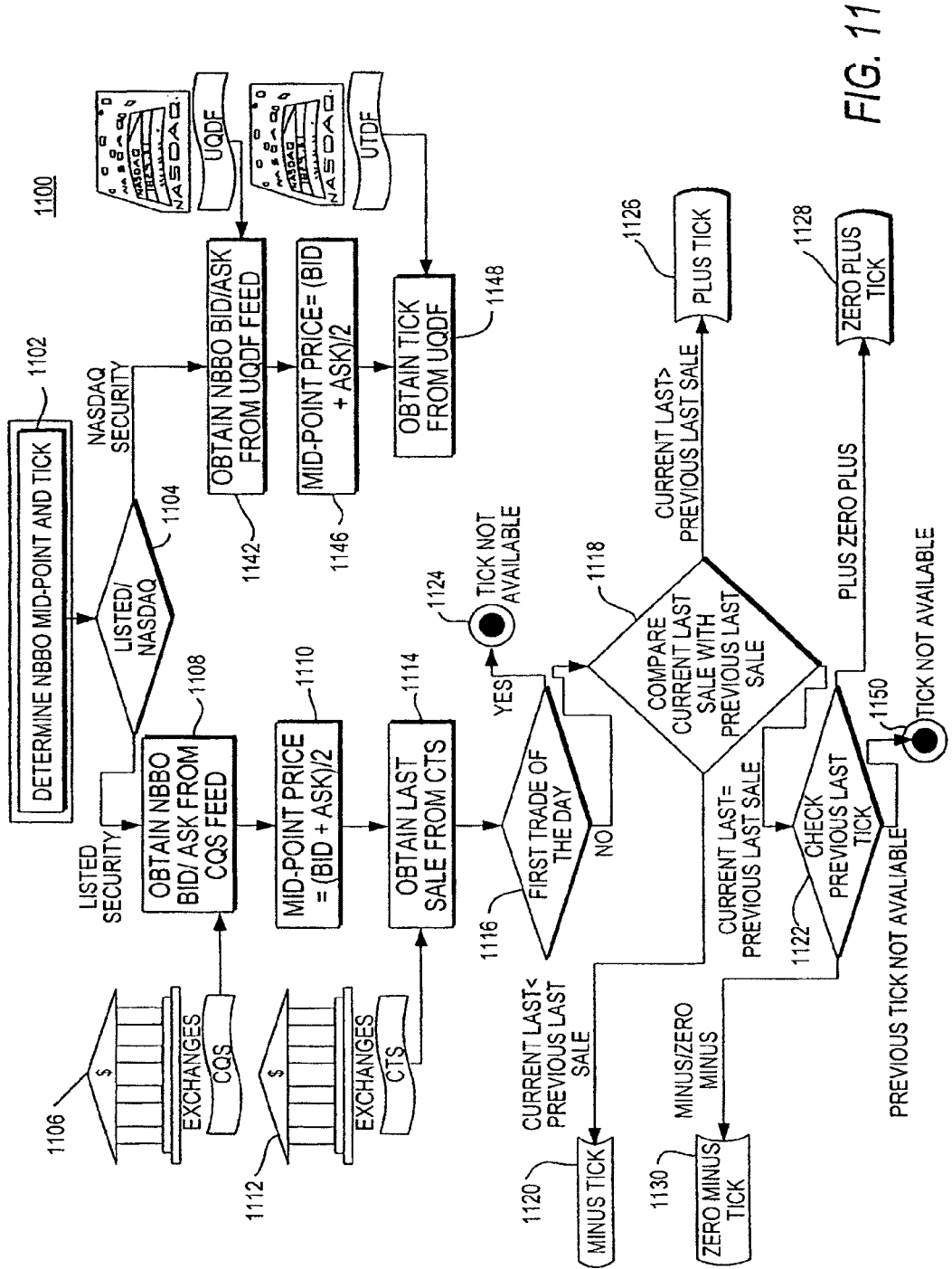
FIG. 11 is a diagram illustrating the NBBO midpoint calculation and Tick relevance based on information related to one or more exchanges according to the present invention.

FIG. 11 is a diagram illustrating the NBBO midpoint calculation and tick relevance based on information related to one or more exchanges according to the present invention.

It is also an embodiment of the present invention that sell short orders that pass tick validation are eligible for matching.

The present invention provides that reserve orders that are not eligible for execution when received remain on the book, during which they can become eligible for exposure to the matching process when the NBBO midpoint changes to make them eligible. The present system will perform all of its executions at the NBBO midpoint. There is one execution price for a given NBBO bid and ask.

According to one embodiment of the invention, upon receipt of new bid and/or ask price resulting in a new midpoint calculation, eligible orders residing on the reserve book are executed before processing any incoming order, thereby preserving time priority. All order types, including market orders and boundary orders, will execute at the NBBO midpoint. All orders types are eligible to match against each other. For example, an SOI order can be matched against any eligible Reserve Orders and other SOIs. However, SOI orders have execution priority over Reserve Orders during the SOI_Life_Time interval.

According to one embodiment of the invention, a minimum price parameter is established such that, if both the NBBO bid and NBBO offer are equal to or greater than the minimum-price, then a valid NBBO midpoint execution price is achieved. The midpoint price is expressed in one cent or half-cent increments.

If the NBBO bid or ask is less than the minimum price, no orders will execute, including any boundary orders at minimum price or higher and market orders residing on the book.

The process described above is illustrated in FIG. 11 as algorithm 1100. Step 1102 shows that an NBBO midpoint and tick is established. A determination is made if the order is a listed security or a NASDAQ security in step 1104.

If the order is a listed security, the NBBO bid/ask is obtained from a feed, as shown in step 1108. This feed is typically provided by an exchange 1106. The midpoint price is an average of the bid and ask and is calculated as the bid plus the ask, divided by two, as shown in step 1110. The tick is determined as follows, a last sale is obtained from CTS 1112, as shown in step 1114. A determination of the first trade of the day is made, as shown in step 1116. If it is, the tick is not available, as shown in step 1124. If it is not the first trade of the day, a comparison of the current last sale and the previous last sale is made in step 1118. Based on that comparison, if the current last is less than the previous last sale, step 1120 shows a minus tick. If the current last exceeds the previous last sale step 1126 shows a plus tick.

If the current last is equal to the previous last sale, the previous last tick is checked, as shown in step 1122. A result of plus zero plus yields a zero plus tick, as shown in step 1128 and a minus zero minus yields a zero minus tick, as shown in step 1130. If the previous tick is not available, end step 1150 is reached.

If the instrument is a NASDAQ security, the NBBO bid/ask is obtained from the UQDF feed, as shown in step 1142. The midpoint is an average of the bid and ask and is calculated as the bid plus the ask divided by two, as shown in step 1146. The tick is obtained from UTDF, as shown in step 1148.

Cancellation Procedure

Figure 13:
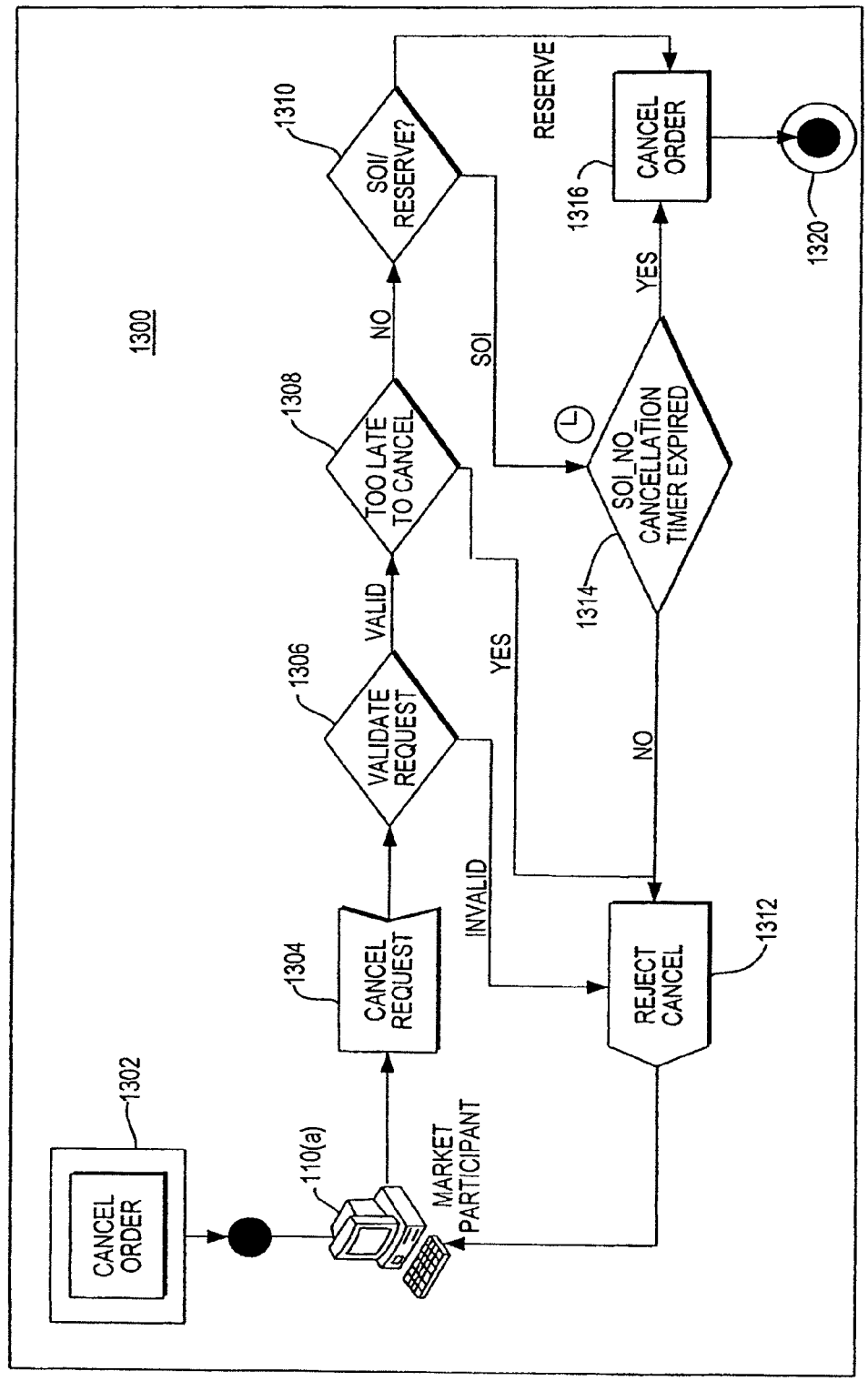
FIG. 13 shows an order cancellation procedure according to the present invention.

FIG. 13 shows an order cancellation procedure 1300. In step 1302 an order is provided by a market participant 110(a). The participant then provides a cancel request as shown in step 1304. A determination of the validity of the request is made in step 1306. If invalid, rejection of the cancel order is performed in step 1312 and a report of that action is provided to the participant system 110(a). If the request is valid, a determination of the timeliness of the cancel order is determined in step 1308. If it is too late, step 1312 is reached. If it is not too late, a determination of an SOI or reserve order is made in step 1310.

If the order is an SOI, step 1314 determines whether the SOI cancellation timer has expired. If not, step 1312 is reached. If the timer has expired, cancel order step 1316 is reached. If step 1310 determines a reserve order is placed, cancel order step 1316 is reached. Following cancel order step 1316, end step 1320 is reached.

First Trade Procedure

Figure 14:
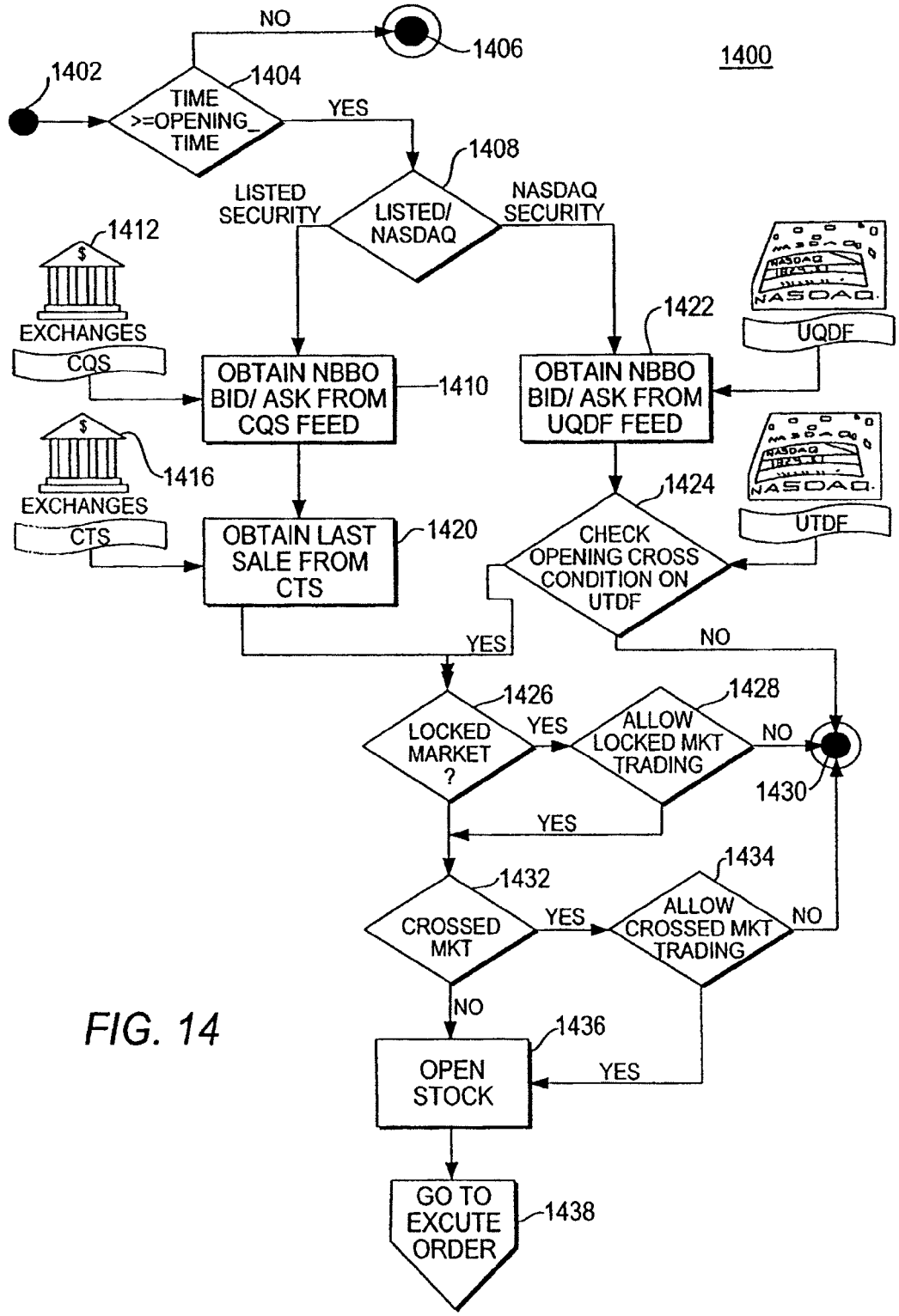
FIG. 14 shows conditions to perform a first trade for a commodity according to the present invention.

FIG. 14 shows conditions to perform a first trade algorithm 1400 for an instrument according to an embodiment of the invention. Start step 1402 is followed by a timing determination step 1404. If the timing is not open end step 1406 is reached. If the timing is open, a determination is made in step 1408 whether the instrument is a listed security or a NASDAQ security.

For a listed security, the system will obtain an NBBO bid/ask from a CQS feed 1412 as shown in step 1410. Step 1420 shows that the last sale from CTS 1416 was determined. If last sale data is found, a determination is made in step 1426 whether the market is locked. If so, step 1428 determines if locked market trading is permitted. If not, end step 1430 is reached. If yes, a determination is made in step 1432 whether a crossed market exist. If yes, step 1434 determines if crossed market trading is permitted. If not, end step 1430 is reached. If so, an open stock determination is made in step 1436. Step 1438 shows that the order is executed.

When step 1408 determines a NASDAQ security step 1422 obtains an NBBO bid/ask price from a UQDF feed. Step 1424 determines an opening at a crossed condition, if not end step 1430 is reached. If so, step 1426, as described herein, is reached.

Maximization Algorithm

It is another embodiment that the execution of the transactions will be performed as efficiently as possible to maximize the volume of transactions that are executed. While many types of algorithms may be used, the following is an example of one algorithm that provides efficient exchanges based on the quantities of instruments available.

The following algorithm will run when an executable order cannot be executed under the priority scheme.

For marketable AON orders on one side of the book, the matching algorithm finds the volumes from all possible sums on the order quantities. This algorithm is run for both sides of the book. It then finds the largest volume that both sides have in common. Finally, it repeats, or "walks back" through the orders to find which ones would trade to the specified volume.

Details of the Algorithm:

When one side of the book has three marketable AON orders (there are no regular orders) with the quantities are 7, 3 and 2. For purposes of this example, the orders are sorted in time priority with 7 having the highest priority and 2 having the lowest priority. The algorithm is as follows.

1. Table Set up: On the left side, rows are added for each order quantity in reverse priority order, with an initial row containing 0 (which signifies the volume from no orders trading). The entire range of volume levels are added along the top (this would be 0-12, 0 for no orders trading and 12 for 2+3+7). This table will show the volumes that any set of orders can trade at.

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 |   |   |   |   |   |   |   |   |   |   |    |    |    |
| 2 |   |   |   |   |   |   |   |   |   |   |    |    |    |
| 3 |   |   |   |   |   |   |   |   |   |   |    |    |    |
| 7 |   |   |   |   |   |   |   |   |   |   |    |    |    |

2. Establish First Row: For the first row, the only volume from 0 is 0. An "a" in a column will indicate that the volume can be made from the order quantity at the row containing the "a" and any previous rows. So for the first row, an "a" is in column 0 only.

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 | a |   |   |   |   |   |   |   |   |   |    |    |    |
| 2 |   |   |   |   |   |   |   |   |   |   |    |    |    |
| 3 |   |   |   |   |   |   |   |   |   |   |    |    |    |
| 7 |   |   |   |   |   |   |   |   |   |   |    |    |    |

3. Establish Second Row: For the second row, the location of any "a" is shifted from the previous row to the right by the quantity specified in the far left column. So, for the second row, any shifted "a's" are the volumes that contain the quantity in the second row. These shifted positions will be labeled with a "b". From the above table, the first row is shifted to the right by two and the result is placed in the second row:

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 | A |   |   |   |   |   |   |   |   |   |    |    |    |
| 2 |   |   | B |   |   |   |   |   |   |   |    |    |    |
| 3 |   |   |   |   |   |   |   |   |   |   |    |    |    |
| 7 |   |   |   |   |   |   |   |   |   |   |    |    |    |

4. Establish Third Row: Now any existing "a's" from the previous row are copied to the new row. The copied "a's" represent the volumes that do not include the current order quantity. So copying the "a" from column 0, updates the second row to look like:

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 | A |   |   |   |   |   |   |   |   |   |    |    |    |
| 2 | A |   | B |   |   |   |   |   |   |   |    |    |    |
| 3 |   |   |   |   |   |   |   |   |   |   |    |    |    |
| 7 |   |   |   |   |   |   |   |   |   |   |    |    |    |

Thus, the second row means that with an order of 2, either trade 0 (don't trade the quantity of 2) or 2 (trade the quantity of 2).

5. Modify Third Row: Now for the third, the second row is shifted to the right by 3 and saving the result to the third row:

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 | a |   |   |   |   |   |   |   |   |   |    |    |    |
| 2 | a |   | B |   |   |   |   |   |   |   |    |    |    |
| 3 |   |   |   | b |   | b |   |   |   |   |    |    |    |
| 7 |   |   |   |   |   |   |   |   |   |   |    |    |    |

6. When copying the previous row, any "b" from the previous row becomes an "a" in the current row. If a cell contains a "b" before copying the previous row, the "b" should remain a "b". So copying the orders from the previous row, the result for the third row is:

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 | a |   |   |   |   |   |   |   |   |   |    |    |    |
| 2 | a |   | B |   |   |   |   |   |   |   |    |    |    |
| 3 | a |   | A | b |   | b |   |   |   |   |    |    |    |
| 7 |   |   |   |   |   |   |   |   |   |   |    |    |    |

Thus, the third row means that with an order of quantity 2 and an order of quantity 3, either trade 0 (no orders), 2 (trade the quantity of 2), 3 (trade the quantity of 3), or 5 (trade the 2 and the 3).

7. The first step for the last row would offset row 3 by 7 and give the result:

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 | a |   |   |   |   |   |   |   |   |   |    |    |    |
| 2 | a |   | B |   |   |   |   |   |   |   |    |    |    |
| 3 | a |   | A | b |   | b |   |   |   |   |    |    |    |
| 7 |   |   |   |   |   |   |   | b |   | b | b  |    | b  |

8. Now copying row 3 gives a final result of:

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 | a |   |   |   |   |   |   |   |   |   |    |    |    |
| 2 | a |   | b |   |   |   |   |   |   |   |    |    |    |
| 3 | a |   | a | b |   | b |   |   |   |   |    |    |    |
| 7 | a |   | a | a |   | a |   | b |   | b | b  |    | b  |

The final row contains all possible volumes that a subgroup of these orders can trade at.

Finding the Orders Associated with a Volume

If the above-described algorithm is used for a set of orders on the other side and it was found that the largest column for which they both have an "a" or a "b" is 9. That means that the maximum deal volume for that set of orders is 9. For this portion the algorithm "looks" only at "b's" because they represent the possible deal volumes that contain the order quantity in this row. This is the reason for not overwriting a "b" with an "a".

Using the result table in step 8:
  1. In the last row above, if there is a "b" in column 9, this is equivalent to determining if there is a volume of 9 that contains the quantity from the last row. A "b" in the column means that this row participated in the trade. The last order in the graph is checked first because it actually has the highest priority. The last row has an "a", so this order quantity is subtracted from the total volume and this order is added to the list of traded orders. This new volume represents the volume remaining in the deal where the corresponding orders have not been discovered. In this example, the remaining volume that is needed is 2.

2. Moving up the graph, find the next row that has a 'b" in the column of the remaining volume.
3. If the current row does not contain an "a" in the column of the remaining volume, the row is skipped and the next row is determined.
4. Following these procedures, the order quantities that make up the deal volume of 9 are 7 and 2.
5. If no orders can trade, then max volume will be 0 initially, and the algorithm will end.

This algorithm selects a matched group of orders based on highest priority of any traded order in that group, or a "best of the best" algorithm. The algorithm can be modified so that it selects a group of matched orders whose priority is better than any of the other matched groups' worst priorities, or a "best of the worst" algorithm. In either case, the algorithm will only consider groups of orders whose quantities add to the maximum volume.

The benefits of doing the order matching in this manner occur because the shifting of the volumes and the copying of the previous row can each be done in a single computer operation. So the entire algorithm, assuming that the sum of all AON order quantities on either side isn't extremely large (50,000,000), can run in near linear time with respect to the number of orders that it is matching. So matching 20 orders of size 10,000 would take about two and a half times as long as matching 10 orders of size 10,000. Doubling the average order size decreases the speed by 30%-40%. Thus, number of orders, including all orders at opening rotation, can be processed efficiently.

Figure 15:
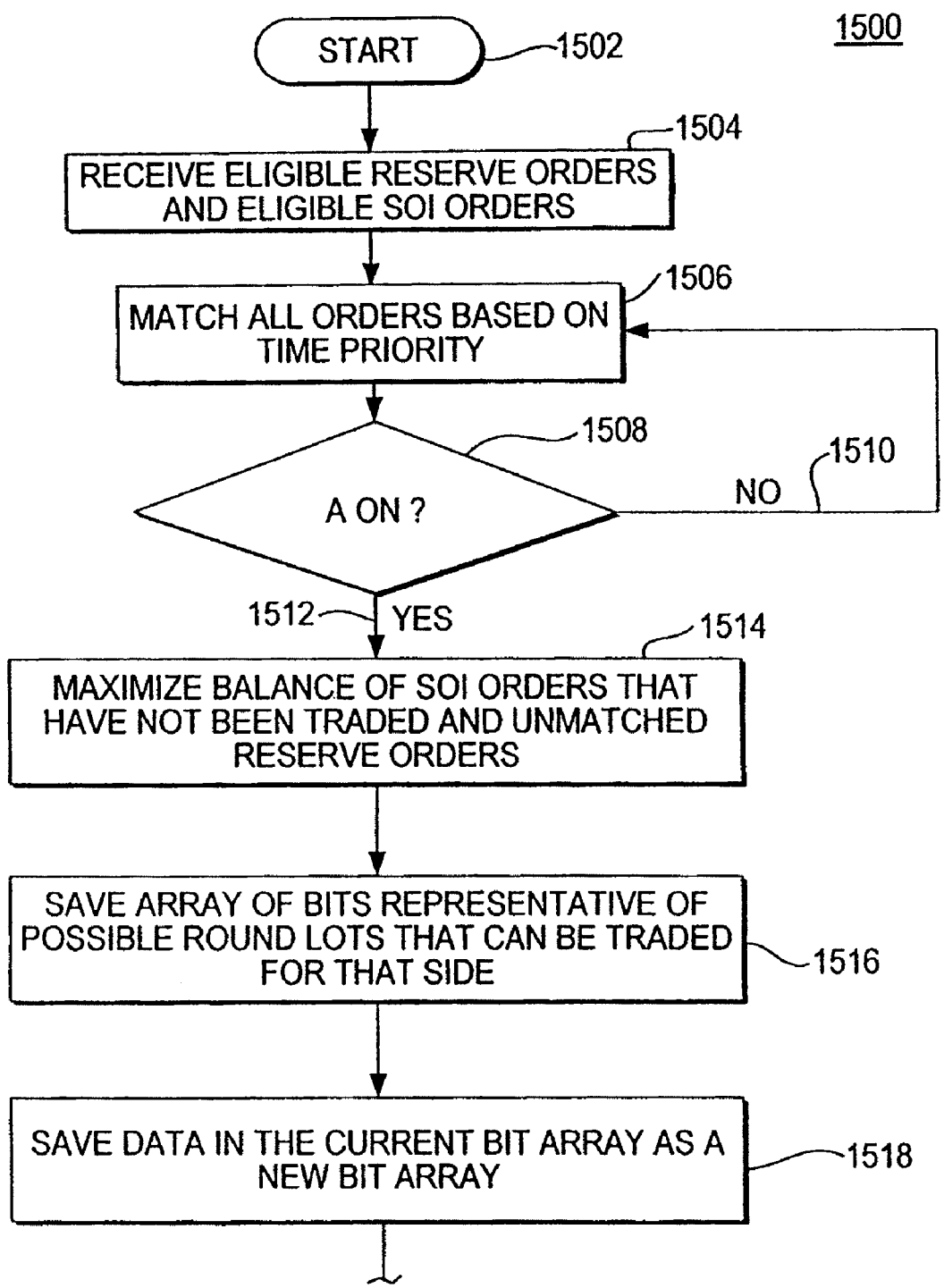
FIG. 15 shows a maximization algorithm used according to the present invention.

FIG. 15 shows a maximization algorithm 1500 used according to the present invention. As shown in FIG. 15, start block 1502 begins the algorithm. Eligible SOI and reserve orders are received as shown in step 1504. Orders are matched based on time priority as shown in step 1506. The presence of orders with all or none instructions is determined in step 1508. If no AON orders are found, line 1510 leads to step 1506. If an AON order is detected, "yes" line 1512 shows that the unexecuted balance of SOI orders and reserved orders will be executed according to an algorithm that maximizes their trades, as shown in step 1514. Step 1516 shows that an array of bits representing possible round lots (for SOI and reserve orders) that can be traded for that side are determined. Step 1518 shows that data is saved in the current bit array as a new bit array.

Decision step 1520 determines whether the order is an AON or a regular order. Line 1521 shows that step 1522 is reached if the order is an AON order. In step 1522 each bit is moved "n" places to perform a shift operation. The bits that have been moved, or shifted, are copied as shown in step 1524. Step 1526 shows that the final bits from the shift operation are stored.

If step 1520 determines that it is a regular order, line 1523 leads to step 1540 in which the bits between the original location and the new location are set, a "smudge" operation. Step 1544 shows that the new array is copied into the original bit array. Step 1546 shows that the new array ("smudged array") is stored. Step 1550 shows that the new bit array for the regular order is compared to the new bit array for the AON order. Step 1552 shows that a match is made between the stored bits for the regular order and the stored bits for the AON order. This number of bits represents the number of round lots that may be traded. Step 1554 shows that the algorithm ends.

Linked Markets

Figure 16:
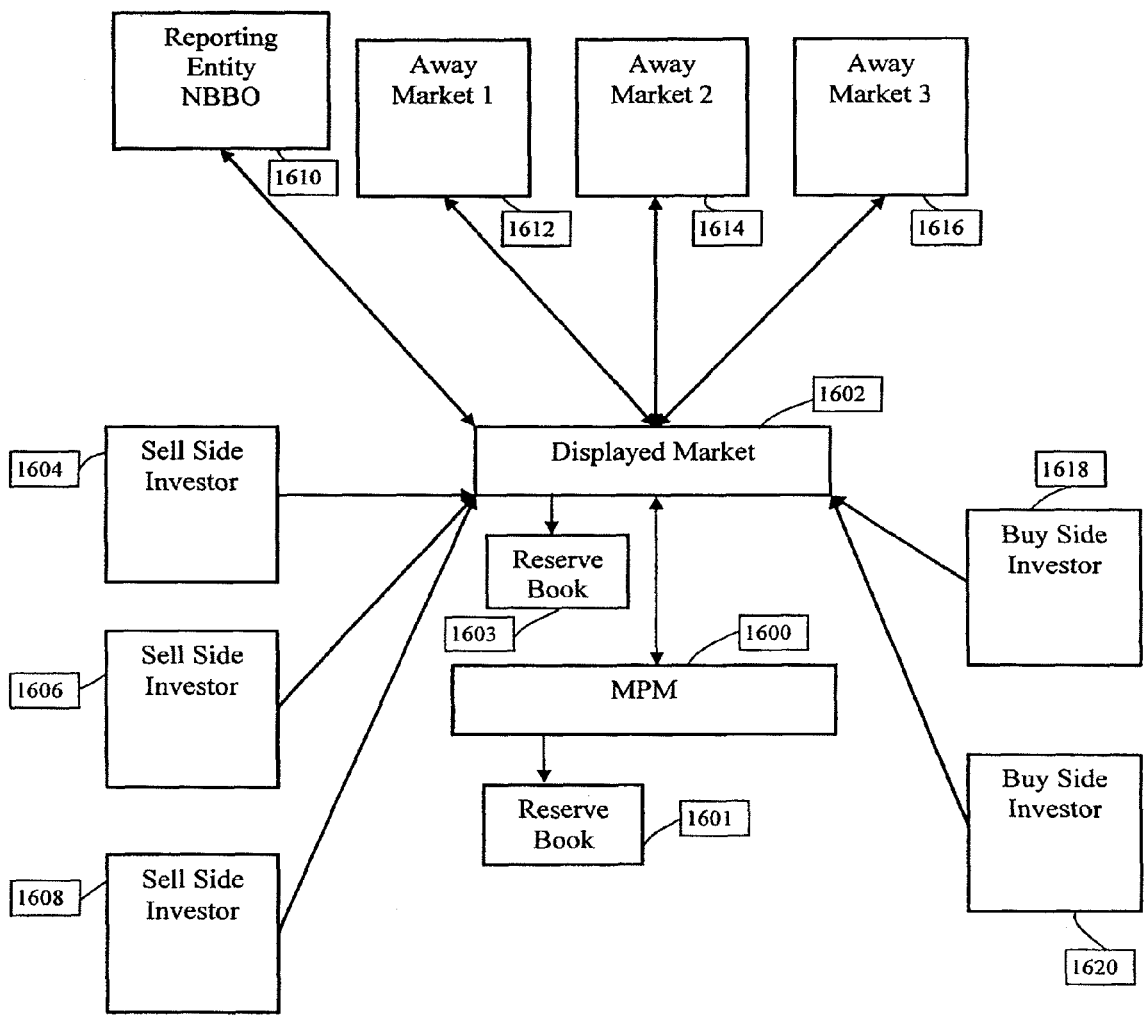
FIG. 16 is a diagram illustrating a linked displayed market and non-displayed midpoint matching market according to an embodiment of the present invention.

FIG. 16 illustrates a further embodiment of the present invention. A non-displayed continuous market for matching orders at the midpoint of the BBO (MPM) 1600 is linked with a displayed or transparent auction equity market system 1602. The displayed market 1602 can communicate orders to other Away Markets 1612, 1614 and 1616 and reporting entity 1610. As described below, the displayed market 1602 and MPM 1600 can work together to increase liquidity on both markets or can function independently from one another.

The displayed market 1602 and MPM 1600 may be operated by a single business entity, for example, International Securities Exchange, LLC. Alternatively, the displayed market 1602 and MPM 1600 can be operated by distinct business entities.

According to the embodiment shown in FIG. 16, the MPM 1600 is connected to the displayed market 1602. Orders can be submitted by one or more investors 1604, 1606, 1608, 1618 and 1620 via a single entry point, for example, the displayed market 1602. Those orders can then either be matched on the MPM 1600 or the displayed market 1602. Where an order and a contra order for a security are both submitted to the MPM 1600, the MPM 1600 matches the orders and trades them at the midpoint of the best bid and offer prices. According to one embodiment of the invention, trades take place at the midpoint of the national best bid and offer (NBBO). According to another embodiment of the invention, orders submitted to the MPM 1600 remain hidden from other investors.

The MPM 1600 includes a reserve book 1601 that stores orders submitted to the MPM 1600 that are not immediately marketable because no eligible contra order is available or other restrictions exist preventing a match. According to one aspect of the invention, the reserve book 1601 is hidden from other parties.

According to a further aspect of the invention, the MPM reserve book 1601 includes all the features of the embodiments of the invention disclosed with respect to FIGS. 1 to 15. For example, an order placed on the MPM 1600 by an investor may be an SOI order, including instructions to transmit specified information about the order to one or more market participants, to receive responses to the SOI and to execute the order against the responses and other orders as described above. Likewise, the order could be an RFC order or a reserve order as described above with respect to other embodiments of the invention.

Investors can also submit orders to the displayed market 1602. The displayed market 1602 provides an exchange where orders for a security can be bought and sold at displayed prices. Typically, the displayed market 1602 will provide information about its best bid and offer price (i.e., the BBO) to other market participants or else make its BBO prices publicly available, for example, through news services or the Internet.

Also connected with the displayed market 1602 is a reporting entity 1610. The reporting entity 1610 receives information from the displayed market 1602 about its BBO and also records and reports trades to the public or to information subscribers. The reporting entity 1610 may also report trades to the tape. The displayed market 1602 communicates its BBO to the reporting entity 1610. When the bid and/or offer on the displayed market 1602 is better than the price on other markets, e.g., the away markets 1612, 1614, 1616, the price on the displayed market 1602 becomes the NBBO.

Away markets 1612, 1614, 1616 are other exchanges or alternative display facility (ADF) protected markets that trade the same security as the displayed market 1602. The Away Markets 1612, 1614, 1616 also provide information to the reporting entity 1610. When an Away Market's BBO is as good as the price offered on any other market, that price is at the NBBO.

Orders submitted to the displayed market 1602 can be limit orders, which specify an acceptable price to buy or sell the security. Where a contra order at a price as good as or better than the limit price is available, the limit order is marketable. Orders also include market orders, which will execute at the BBO price or, if an improved price is available on the MPM 1600 or Away Market 1612, 1614, 1616, will execute at the improved price. Orders submitted to the displayed market 1602 that are not immediately marketable are stored on the displayed market reserve book 1603.

Figure 17A:
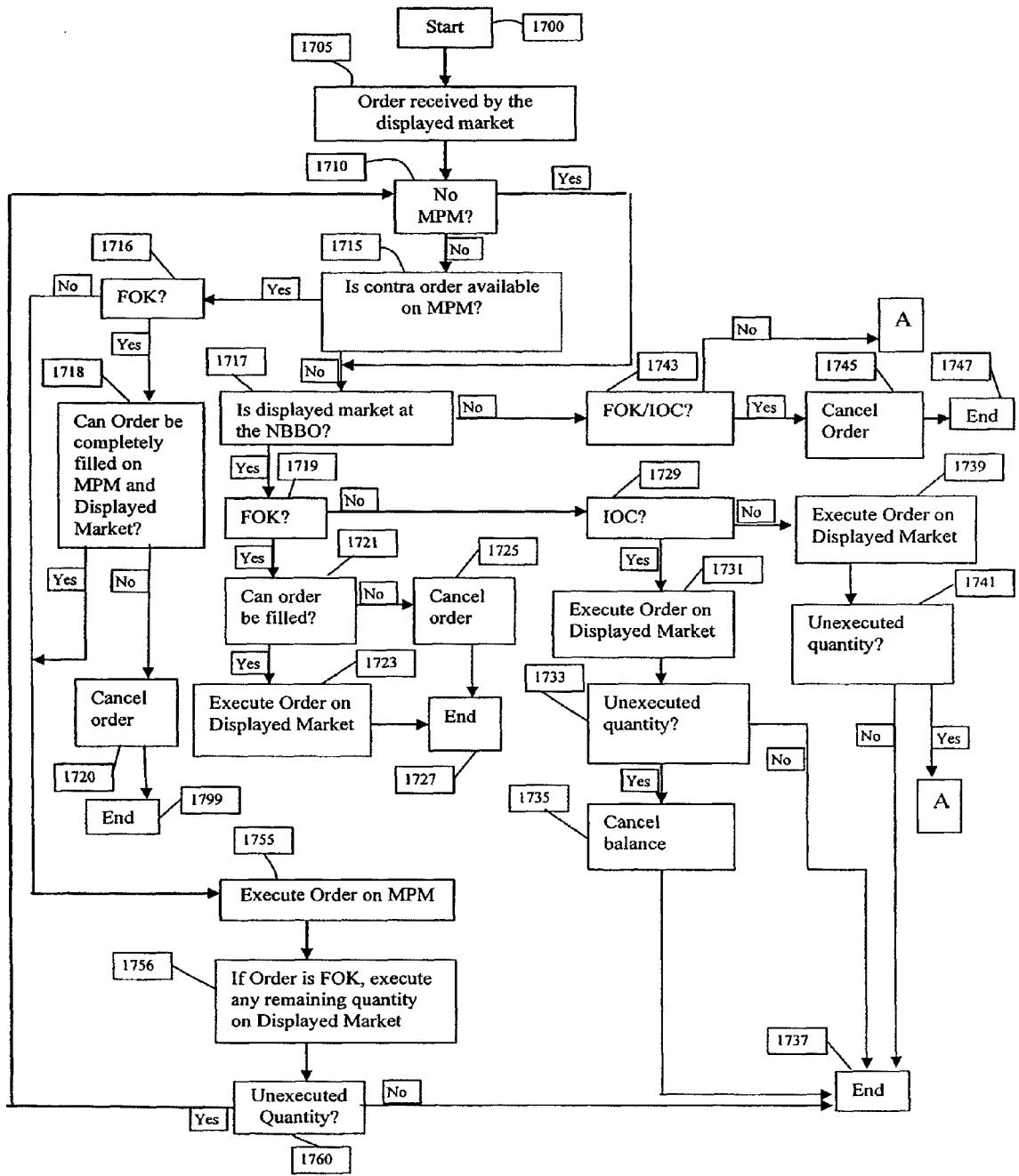
FIGS. 17a and 17b are flowcharts illustrating the operation of a market according to an embodiment of the present invention where an order includes a Route to Displayed Market instruction.
Figure 17B:
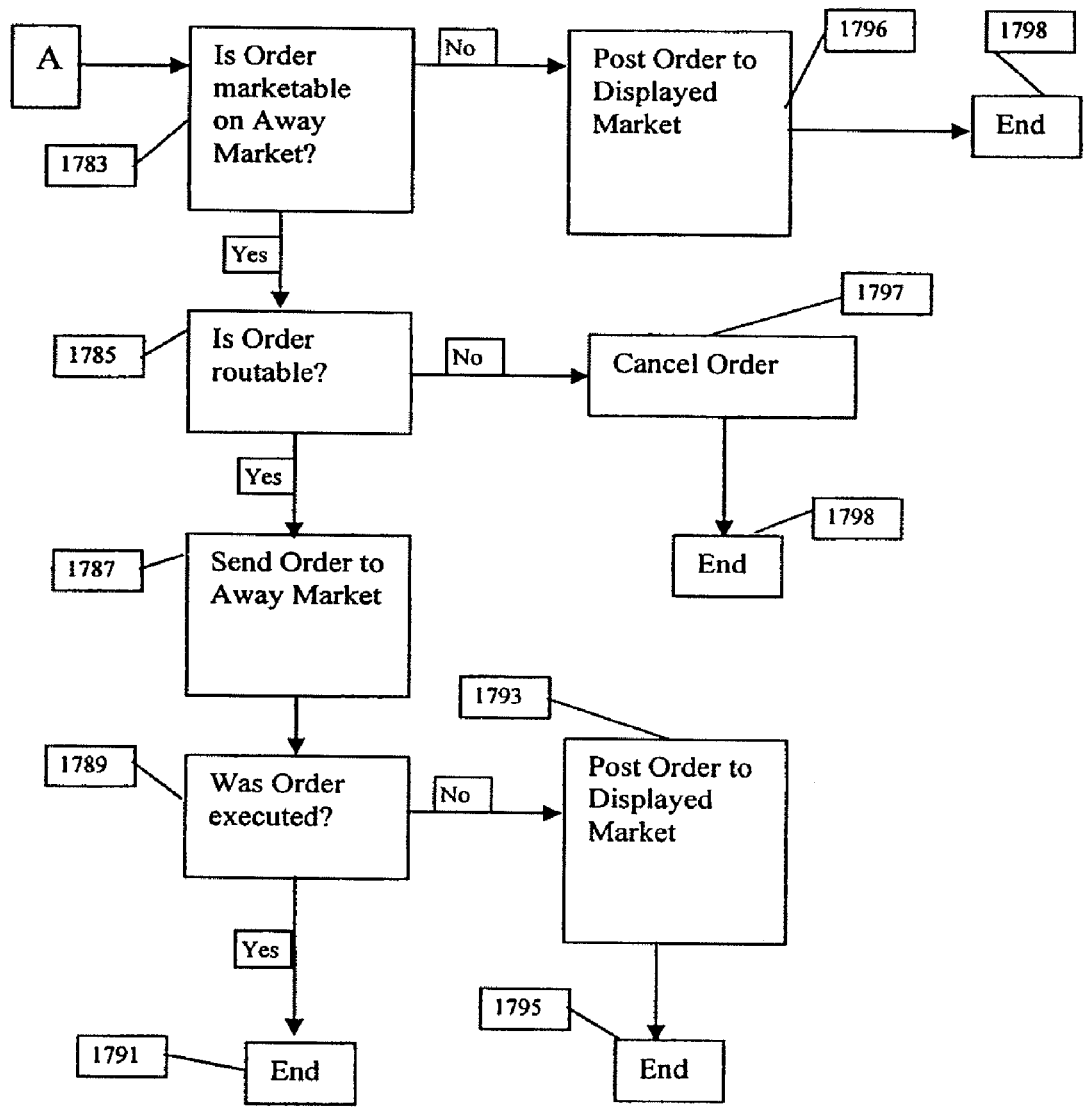

Orders submitted to the displayed market 1602 can also include discretionary orders. A discretionary order is one where a limit price and an acceptable price range are specified. Such an order trades on the displayed market 1602 if the BBO is within its discretionary price range. For example, an investor 1604 may submit a discretionary buy order with a limit price of $10.50 per share and a range up to $10.60 per share. Such an order is marketable if the BBO at the displayed market 1602 or at the midpoint of the NBBO on the MPM 1600 are between $10.50 and $10.60. It is also marketable at $10.50 if it can be executed at an Away Market 1612, 1614, 1616. If the discretionary order is not immediately marketable it is stored on the displayed market reserve book 1603 and the limit price of $10.50 per share price is displayed. The $10.60 price remains hidden. As shown in FIGS. 17a and 17b and discussed below, unless the order includes a "No MPM" instruction, the system will expose the order to the MPM market 1600. If the NBBO midpoint is within the discretionary range and a contra order is available, the order will trade at the midpoint. In the present example, if the NBBO is $10.50×$10.60 and a contra order is available, the two orders would match at the $10.55 NBBO midpoint. Any remaining quantity would trade on the displayed market 1602 at a price from $10.50 to $10.60. For example, if the best offer is at $10.57, the discretionary order would execute at the $10.57 against orders on the displayed market book 1603. As a result, the seller and other parties become aware that there was some discretionary status associated with the buy order, but the limit of the discretionary buy order (i.e., that the buyer would have been willing to spend $10.60) remains hidden.

As discussed above, orders submitted to the displayed market 1602 can be routed to an Away Market 1612, 1614, 1616 when the price on the Away Market is improved. This avoids so-called trade-through executions on the displayed market 1602. The order will not execute at a price inferior to the best bid or asking price on any of the markets 1602, 1612, 1614, 1616.

Investors may also submit orders that will trade only on the MPM 1600 and remain hidden. Such orders include a "Route to MPM" instruction. If they do not execute against a contra order on the MPM reserve book 1601 immediately when they are submitted, they are stored on that reserve book 1601 until a suitable contra order is received, as will be described below. Also, RFC orders, which cannot execute until expiration of the exposure period remain on the MPM reserve book 1601. Once the exposure period of the RFC order expires, the order can be matched with orders on the displayed market executable at the midpoint of the NBBO and with other orders on the MPM reserve book 1601, including reserve orders, SOI orders and RFC responses. According to one embodiment of the invention, RFC orders are matched first against orders stored on the MPM reserve book 1601 and any remaining quantity of the RFC order is then matched against orders on the displayed market 1602 that are executable at the midpoint of the NBBO.

Investors may also specify that an order is to be submitted to the displayed market 1602 by including a "Route to Displayed Market" instruction. As will be more fully described below, such an order is eligible to trade at the BBO of the displayed market 1602, or at the midpoint of the NBBO if there is a suitable contra order on the MPM reserve book 1601. If a better price is available on any Away Market 1612, 1614, 1616, the order will be routed out for execution. The Route to Displayed Market instruction also allows for conditions or restrictions of the management of the displayed order and market exposure.

An order with a Route to Displayed Market instruction may include an Immediate or Cancel (IOC) condition. Such an order is not stored on the displayed market reserve book 1601. Instead, the order is exposed to the displayed market 1602 and the MPM 1600. If an immediate match is available, the order is executed. If no immediate match can be made, it is cancelled and a message is sent to the market participant submitting the order.

Another condition that may be specified for a Route to Displayed Market order is a "No MPM" condition. Under the No MPM condition, the order will not be matched against orders on the MPM reserve book 1601 regardless of their eligibility.

A Route to Displayed Market order may also include a "Not Routable" condition. Under the Not Routable condition, orders are confined to the displayed market 1602 and the MPM 1600. Such an order cannot be routed to the Away Markets 1612, 1614, 1616 regardless of potential price improvement. A Route to Displayed Market order may include both a Not Routable condition and a No MPM condition. Such orders are neither exposed to MPM 1600 nor are they Routed-Out to other markets 1612, 1614, 1616. Instead, they can trade only on the displayed market 1602.

FIGS. 17a and 17b show an algorithm, program code, series of steps or software, stored on a computer-readable medium that is executable at a server apparatus and/or participant system, for executing an order according to the present invention. It may represent, for example, a computer program running on a server 102 shown in FIG. 2 and/or a terminal 110 shown in FIG. 3. An order is received on the displayed market 1602 at step 1705. The system identifies whether the incoming order has a "No MPM" condition at step 1710.

According to one embodiment of the invention, if an order with a Route to Displayed Market instruction enters the system that does not include a "No MPM" condition, the system exposes the incoming order to the MPM 1600 to determine if an eligible contra-side order is available in step 1715. If the system identifies an eligible contra-side MPM order, the incoming order and contra order are executed at the midpoint of the NBBO at step 1755 as will be explained below. If no contra order is available on the MPM 1600, the order is exposed to the displayed market 1602 and, if it is marketable, it is executed at steps 1723, 1731, or 1739 on the displayed market 1602.

If at step 1715 the system determines that there is an eligible contra order on the MPM 1600, then at step 1716 the system checks whether the order includes a fill-or-kill instruction. If it does not, the order is executed on the MPM

1600 at step 1755. Step 1756 applies only if the order has a fill-or-kill instruction so does not affect this example. At step 1760 the system determines whether any quantity in the order remains unexecuted. If so, the system returns to step 1710 and processing continues. If no quantity remains unexecuted, the process ends at step 1737.

If at step 1716 the system determines that the order includes a fill-or-kill instruction, then at step 1718 the system determines whether the order can be completely filled against orders on both the MPM 1600 and the displayed market 1602. If not, the order is cancelled at step 1720 and the process ends at step 1799. If the order can be filled against orders on both markets, then at step 1755 the order is executed on the MPM 1600 and any remaining quantity of the fill-or-kill order is executed on the display market 1602 at step 1756. Since no quantity remains at step 1760 the process ends at step 1737.

If at steps 1710 and 1715 any portion of the order remains and there are no contra orders on the MPM reserve book 1601, the process proceeds to step 1717 where the system determines if the displayed market 1602 is at the NBBO. If the displayed market is at the NBBO, at step 1719 the system determines if the order is has a fill or kill instruction. If so, at step 1721 the system determines if the order can be completely filled on the display market 1602. If it can, the order is executed on the displayed market 1602 at step 1723 and the process ends at step 1727. If the order cannot be completely filled on the display market, the order is canceled at step 1725 and the process ends at step 1727.

If at step 1719 the system determines that the order does not have a fill or kill instruction, then at step 1729 the system determines if it has an immediate or cancel instruction. If so, the order is executed at step 1731 on the displayed market 1602, any unexecuted quantity determined at step 1733 is cancelled at step 1735 and the process ends at step 1737. If the order does not include an immediate or cancel instruction, it is executed on the displayed market 1602 at step 1739. Step 1741 determines if there is any unexecuted quantity and, if not, the process ends at step 1737. If an unexecuted quantity remains, the system determines whether to route the remaining quantity to another market or else post that quantity on the displayed market, as shown in FIG. 17b. Likewise, if the displayed market 1602 is not at the NBBO, and therefore a better price is available on another market, (and the order does not include a fill or kill or immediate or cancel instruction determined at step 1743) the system will determine whether to route it to the other market or post it to the display market as shown in FIG. 17b

In either case, where an order cannot fully trade on the MPM 1600 or displayed market 1602, the system determines whether the order is marketable on another market at the NBBO at step 1783. If the order can trade on that market, and at step 1785 the system determines that there is no instruction that the order cannot be routed, then it is sent to the other market at 1787. At step 1789, the system determines whether the order was executed on the other market or, for example, there was insufficient size at the NBBO when the order arrived there. If the order was not executed, or only partially executed, any remaining quantity of the order is posted to the displayed market 1602 at step 1793. Likewise, if the order is not marketable on the other market the order is posted to the display market 1602 at step 1796 and the process ends at step 1798. If the order is marketable but is marked as non-routable, the order is cancelled at step 1797.

If the order includes a "No MPM" condition, then at step 1710 in FIG. 17a the system skips step 1715 and the order is traded or posted to the display market 1602 if the display market 1602 is at the NBBO. If the displayed market 1602 is not at the NBBO, the order is sent to an away market 1612, 1614, 1616 that is at the NBBO, or it is cancelled as shown in steps 1717, 1719, 1721, 1723-1747 and 1783-1798.

The system periodically checks the MPM reserve book 1601 to determine if there are any orders that can trade with discretionary orders on the displayed market reserve book 1603. The system also checks to determine if changes in NBBO prices make discretionary orders stored on the displayed market reserve book 1603 marketable against contra orders on the MPM reserve book 1601. According to one embodiment of the present invention, marketability of discretionary orders on the displayed market reserve book 1603 against the MPM reserve book 1601 is checked each time a new order is stored on the MPM reserve book 1601 and each time there is a change in price of the midpoint of the NBBO.

Figure 18:
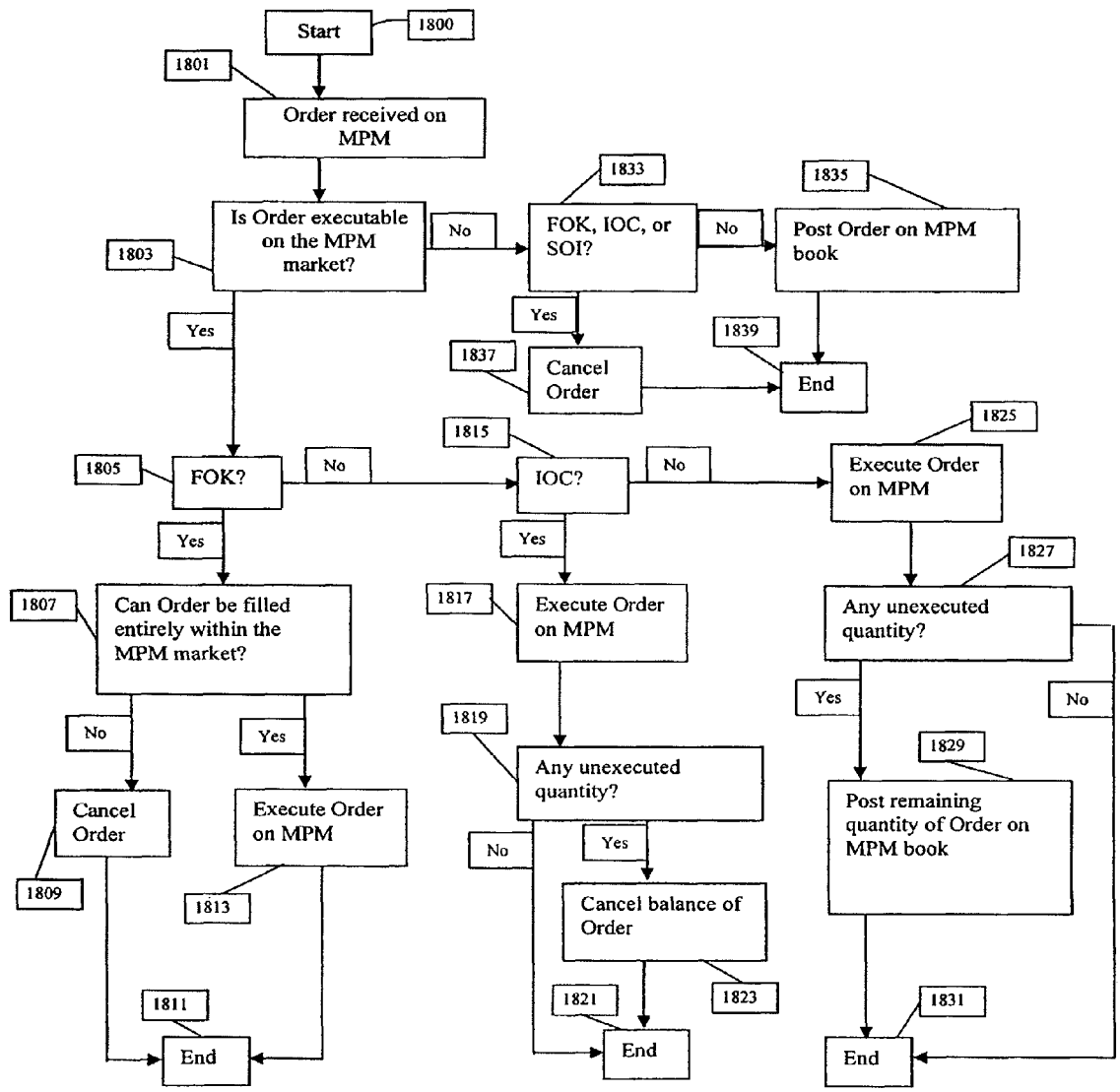
FIG. 18 is a flowchart illustrating the operation of a market according to an embodiment of the present invention where an order includes a Route to MPM instruction.

FIG. 18 is an algorithm, program code, series of steps or software, stored on a computer-readable medium that is executable at a server apparatus and/or participant system, for executing an order according to the present invention. FIG. 18 may represent, for example, a computer program running on a server 102 shown in FIG. 2 and/or on a terminal 110 shown in FIG. 3. It illustrates another embodiment of the invention where the order includes a "Route to MPM" instruction. Such orders are routed to the MPM 1600 for execution at the midpoint of the NBBO. An order may be routed to the process shown in FIG. 18, for example, from step 1755 shown in FIG. 17a. Such an order does not appear on the displayed market 1602 and can remain hidden, for example, where an investor 1604, 1608, 1610 wishes to disclose no information. Alternatively, an investor 1604, 1608, 1610 can include instructions identifying the order as an SOT or RFC order as discussed above with respect to FIGS. 1-15.

At the start of the process 1800, the midpoint of the NBBO has already been determined, for example, from a reporting entity 1610, shown in FIG. 16. The system awaits an incoming order including a "Route to MPM" condition at step 1801. At step 1803 the system determines whether there is a contra order on the MPM reserve book 1601. If there is no such contra order, the system determines at step 1833 whether the order includes a fill-or-kill or immediate-or-cancel instruction or if the order is an SOI order. If any of these are true, the order is cancelled at step 1837 and the process ends at step 1839. If the order is not an FOK, IOC, or SOI order, it is posted to the MPM reserve book 1601 at step 1835. According to an alternative embodiment of the invention, SOT orders are not cancelled as shown in steps 1833 and 1837. Instead, they are posted to the MPM reserve book 1601 and are handled as described above with respect to other embodiments of the invention.

If, at step 1803 the system determines that there is a contra order on the MPM reserve book 1601 that can trade with the incoming order, at step 1805 the system determines if the incoming order includes an FOK instruction. If there is a FOK instruction and at step 1807 the entire order can be traded within the MPM 1600 then the trade is executed at step 1813. If it cannot trade in its entirety, the order is cancelled at step 1809 and the process ends at step 1811.

If at step 1805 the system determines that the order does not include an FOK instruction, then at step 1815 the system determines whether it has an IOC instruction. If so, the order is executed on the MPM 1600 at step 1817, the unexecuted quantity remaining in the order is cancelled at step 1823, and the process ends at step 1821. If the order has neither an FOK or an IOC instruction, then the order is executed on the MPM 1600 at step 1825, any remaining unexecuted quantity detected at step 1827 is posted to the MPM reserve book 1601 at step 1829 and the process ends at step 1831. According to one embodiment of the invention, the order remains on the MPM reserve book 1601 until an eligible contra order is received either on the MPM market 1600 or on the displayed market 1602.

According to a further embodiment of the invention, discretionary orders stored on the displayed market reserve book 1603 shown in FIG. 16 are periodically exposed to the MPM reserve book 1601 to determine if a contra order eligible to trade against the stored order has been received. If so, the stored order is matched against the contra order.

Thus, while fundamental novel features of the invention have been shown and described and pointed out herein, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed fowl or embodiment of the invention may be incorporated in another form or embodiment. It is the intention, therefore, to be limited only as indicated by the scope of the claims appended hereto.

What is claimed is:

1. A method for trading securities comprising:
providing a hidden market for matching incoming orders at a predetermined price against previously received orders stored in a hidden reserve book, wherein the orders remain hidden while they are matched;
providing a displayed market;
receiving first and second orders via an interface, wherein the first order includes an instruction to match the first order only with orders stored in the hidden reserve book;
exposing the first and second orders received by the interface to the hidden market;
determining, by a processor, that the second order is not completely matched against previously received orders on the hidden reserve book; and
exposing the portion of the second order not matched on the hidden reserve book to the displayed market.

2. A method for trading securities comprising:
arranging a first computer memory to hold a plurality of orders, wherein the contents of the first computer memory are hidden from market participants;
arranging a second computer memory to hold one or more orders, wherein one or more of the orders stored in the second computer memory are displayed to market participants;
receiving a plurality of orders via an electronic interface, the plurality of orders including a first and second order, wherein the first order includes an order handling instruction that it will not be stored in the second computer memory;
storing the plurality of orders in the first computer memory;
determining that a portion of the second order can be executed against orders stored in the first computer memory;
executing the executable portion of the second order against the plurality of orders stored in the first computer memory, wherein a remaining portion of the second order is not executed against the orders stored in the first computer memory; and
storing the remaining portion of the second order in the second computer memory.

3. The method of claim 2, further comprising:
determining that no portion of the first order can be executed against orders stored in the first computer memory.

4. The method of claim 2, further comprising:
determining that only a portion of the first order can be executed against orders stored in the first computer memory; and in response to the order handling instruction of the first order,
canceling the first order.

5. The method of claim 2, further comprising:
determining that a portion of the first order can be executed against orders stored in the first computer memory;
executing the executable portion of the first order against orders stored in the first computer memory; and in response to the order handling instruction of the first order,
storing the unexecuted portion of the first order in the first computer memory.

6. The method of claim 2, further comprising:
determining that a portion of the first order can be executed against orders stored in the first computer memory;
executing the executable portion of the first order against orders stored in the first computer memory; and in response to the order handling instruction of the first order,
canceling the unexecuted portion of the first order.

7. The method of claim 2, further comprising
determining that a portion of the remaining portion of the second order can be executed against orders stored in the second computer memory;
executing the portion of the remaining portion of the second order executable against orders stored in the second computer memory, wherein a further portion of the second order is not executed against the orders stored in the second computer memory; and
storing the further portion of the second order in the second computer memory.

8. The method of claim 2, further comprising:
determining that orders stored in the second computer memory can be executed against orders stored in first computer memory when a triggering event occurs.

9. The method of claim 8, wherein the triggering event is storage of a new order in the first computer memory.

10. The method of claim 8, wherein the triggering event is a change in the midpoint of a best bid and offer price.

11. A system for trading securities comprising:
a processor;
an instruction memory connected with the processor for holding program instructions;
a first computer memory connected with the processor configured to hold a plurality of orders, wherein the contents of the first computer memory are hidden from market participants;
a second computer memory connected with the processor configured to hold a one or more orders, wherein one or more of the orders stored in the second computer memory are displayed to market participants;
an electronic interface connected with the processor and controlled by the processor, wherein the electronic interface under the control of the processor executing processing instructions stored in the instruction memory:
receives a plurality of orders including a first and second order, wherein the first order includes an instruction that it will not be stored in the second computer memory; and stores the plurality of orders in the first computer memory; and wherein the processor executing processing instruction stored in the instruction memory;

determines that a portion of the second order can be executed against orders stored in the first computer memory;

executes the executable portion of the second orders against the plurality of orders stored in the first computer memory, wherein a remaining portion of the second order is not executed against the plurality of orders stored in the first computer memory; and stores the remaining portion of the second order in the second computer memory.

12. The system of claim 11, wherein the processor executing processing instructions stored in the instruction memory:

determines that no portion of the first order can be executed against orders stored in the first computer memory; and in response to the order handling instruction of the first order, stores the first order in the first computer memory.

13. The system of claim 11, wherein the processor executing processing instructions stored in the instruction memory:

determines that only a portion of the first order can be executed against orders stored in the first computer memory; and in response to the order handling instruction of the first order, cancels the first order.

14. The system of claim 11, wherein the processor executing processing instructions stored in the instruction memory:

determines that a portion of the first order can be executed against orders stored in the first computer memory;

executes the executable portion of the first order against orders stored in the first computer memory; and in response to the order handling instruction of the first order, stores the unexecuted portion of the first order in the first computer memory.

15. The system of claim 11, wherein the processor executing processing instructions stored in the instruction memory:

determines that a portion of the first order can be executed against orders stored in the first computer memory;

executes the executable portion of the first order against orders stored in the first computer memory; and in response to the order handling instruction of the first order, cancels the unexecuted portion of the first order.

16. The system of claim 11, wherein the processor executing processing instructions stored in the instruction memory:

determines that a portion of the remaining portion of the second order can be executed against orders stored in the second computer memory;

executes the portion of the remaining portion of the second order executable against orders stored in the second computer memory, wherein a further portion of the second order is not executed against the orders stored in the second computer memory; and stores the further portion of the second order in the second computer memory.

17. The system of claim 11, wherein the processor executing processing instructions stored in the instruction memory determines that orders stored in the second computer memory can be executed against orders stored in first computer memory when a triggering event occurs.

18. The system of claim 17, wherein the triggering event is storage of a new order in the first computer memory.

19. The system of claim 17, wherein the triggering event is a change in the midpoint of a best bid and offer price.

20. A system for trading securities comprising:

a processor;

an instruction memory connected with the processor for storing processing instructions, an interface connected with the processor and controlled by the processor executing processing instructions stored in the instruction memory to receive orders;

a hidden reserve book memory connected with the processor for storing orders, wherein the processor executing processing instructions stored in the instruction memory controls the hidden reserve book memory to match incoming orders with stored orders that are executable against one another, and wherein orders stored in the hidden reserve book memory remain hidden while they are matched; and a displayed market connected with the processor, wherein the interface under the control of the processor executing processing instruction stored in the instruction memory receives first and second orders, the first order including order handling instructions that it be matched only with orders on the hidden reserve book memory;

wherein the processor executing processing instructions stored in the instruction memory matches the first and second orders with orders stored in the hidden reserve book memory at a predetermined price;

wherein the processor executing processing instructions stored in the instruction memory determines that the second order is not completely matched with orders stored in the hidden reserve book memory; and wherein the processor executing processing instructions stored in the instruction memory exposes the unmatched portion of the second order to the displayed market.

21. The system of claim 20, wherein, in response to the order handling instruction of the first order, if the first order does not match with an order stored in the hidden reserve book memory, the processor executing processing instructions stored in the instruction memory stores the first order in the hidden reserve book memory.

22. The system of claim 20, wherein, in response to the order handling instruction of the first order, if the first order does not completely match with orders stored in the hidden reserve book memory, the processor executing processing instructions stored in the instruction memory cancels the first order.

23. The system of claim 20, wherein, in response to the order handling instruction of the first order, if the first order is partially matched with orders stored in the hidden reserve book memory, the processor executing processing instructions stored in the instruction memory cancels an unmatched portion of the first order.

24. The system of claim 20, further comprising a second reserve book memory connected with processor, wherein the processor executing processing instructions stored in the instruction memory matches a portion of the unmatched portion of the second order with displayed orders on the displayed market, wherein a further portion of the second order remains unmatched; and wherein the processor executing processing instructions stored in the instruction memory stores the further portion of the second order in the second reserve book memory.

25. The system of claim 24, wherein the processor executing processing instructions stored in the instruction memory matches orders stored in the second reserve book memory with orders in the hidden reserve book memory when a triggering event occurs.

26. The system of claim 25, wherein the triggering event is storage of a new order in the hidden reserve book memory.

27. The system of claim 25, wherein the triggering event is a change in the midpoint of a best bid and offer price.

* * * * *